United States Patent
Ge

(10) Patent No.: US 8,503,793 B2
(45) Date of Patent: Aug. 6, 2013

(54) CORRELATION PROCESSING APPARATUS AND MEDIUM READABLE BY CORRELATION PROCESSING APPARATUS

(75) Inventor: Yi Ge, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 820 days.

(21) Appl. No.: 12/616,894

(22) Filed: Nov. 12, 2009

(65) Prior Publication Data
US 2010/0128989 A1    May 27, 2010

(30) Foreign Application Priority Data
Nov. 21, 2008    (JP) .................................. 2008-298694

(51) Int. Cl.
*G06K 9/48* (2006.01)
(52) U.S. Cl.
USPC ........................................................ 382/199
(58) Field of Classification Search
None
See application file for complete search history.

(56) References Cited

U.S. PATENT DOCUMENTS

| 5,638,460 A * | 6/1997 | Nishimori et al. ............ 382/141 |
| 2003/0194129 A1 * | 10/2003 | Metz et al. .................... 382/173 |

FOREIGN PATENT DOCUMENTS

| JP | 10-134183 A | 5/1998 |
| JP | 2008-84034 A | 4/2008 |

* cited by examiner

*Primary Examiner* — Nirav G Patel
(74) *Attorney, Agent, or Firm* — Fujitsu Patent Center

(57) ABSTRACT

A correlation processing apparatus that obtains a correlation value between an image and a subimage, the apparatus including: N arithmetic circuits, each of the N arithmetic circuits performing an arithmetic operation on a first image pixel value of a first image pixel of the image and a second image pixel value of a second image pixel of the subimage; a rectangular pattern selection circuit selecting a rectangular pattern among a plurality of predetermined rectangular patterns, the rectangular pattern including Q elements, the smallest number of divisions is obtained if the image is divided by the rectangular pattern; a control circuit activating Q arithmetic circuits among the N arithmetic circuits and identifying Q first image pixel values and Q second image pixel values on which the arithmetic operations are performed by the Q arithmetic circuits; and an accumulator accumulating the results of the arithmetic operations performed by the Q arithmetic circuits.

4 Claims, 13 Drawing Sheets

FIG.5 condition:
- the type of the rectangular (ph[i],pw[i]): 1x9, 2x4, 3x3, 4x2, 9x1
- the table depict the number of required pattern for texture size(th,tw): 10x4, 10x5, 10x6, 64x64
- the dotted column depict the min number of entry number.

| Rectangular pattern | | Required number of rectangular pattern | | | |
|---|---|---|---|---|---|
| Number (i) | (ph,pw) | (th,tw)=10x4 | 10x5 | 10x6 | 64x64 |
| 0 | 1x9 | 10 | 10 | 10 | 512 |
| 1 | 2x4 | 5 | 10 | 10 | 512 |
| 2 | 3x3 | 8 | 8 | 8 | 484 |
| 3 | 4x2 | 6 | 9 | 6 | 512 |
| 4 | 9x1 | 8 | 10 | 8 | 512 |

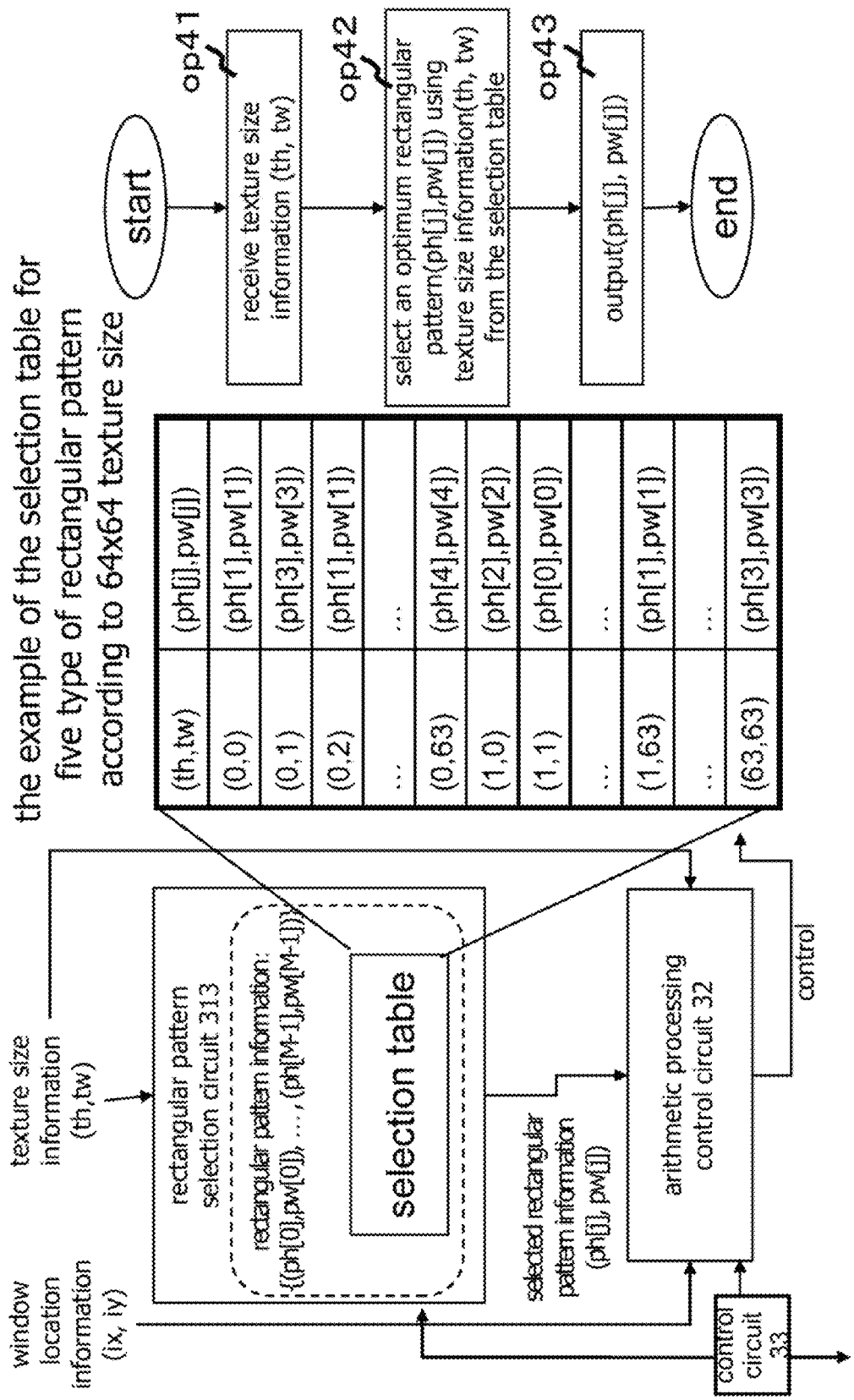

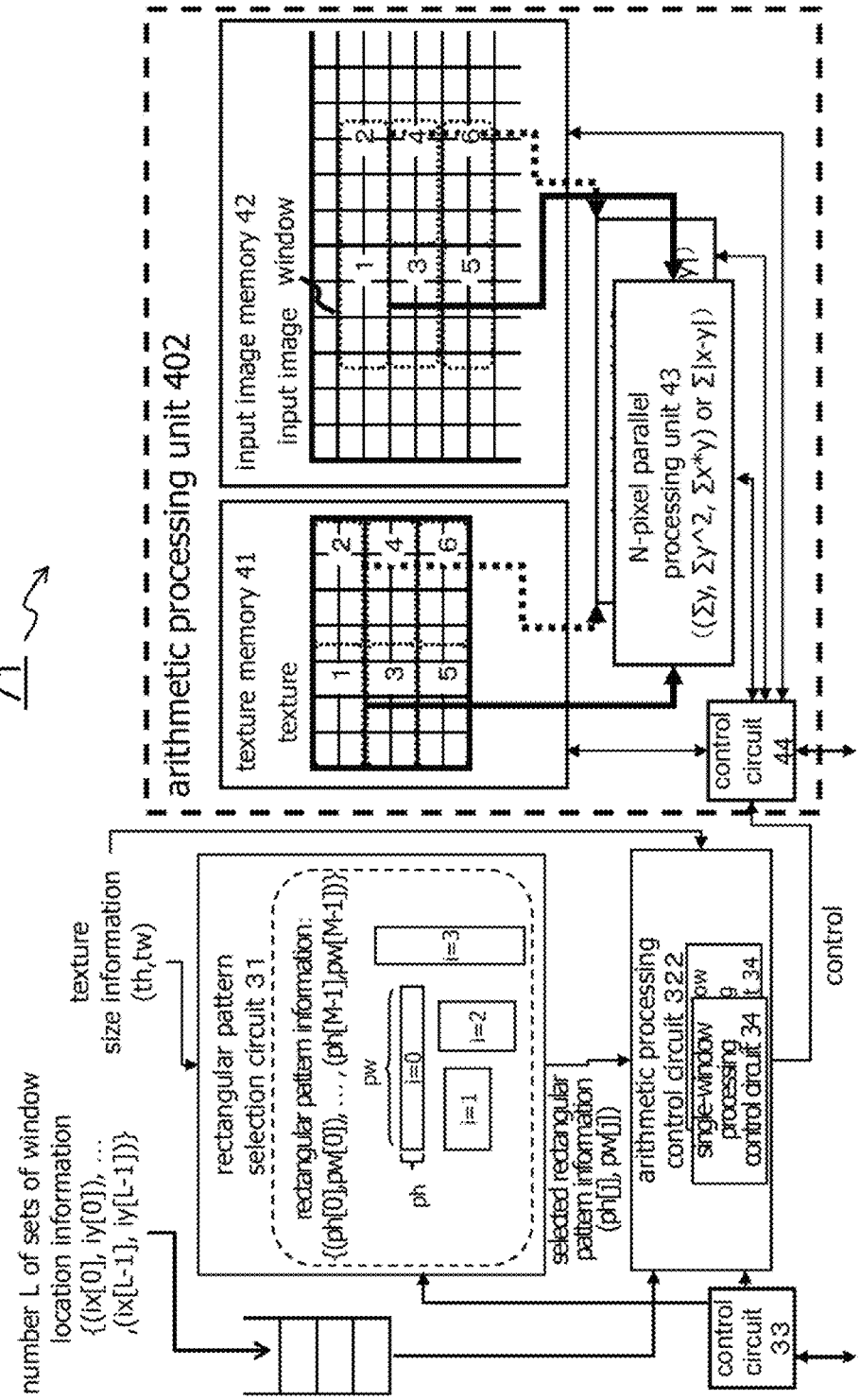

CORRELATION PROCESSING APPARATUS AND MEDIUM READABLE BY CORRELATION PROCESSING APPARATUS

CROSS REFERENCE TO RELATED APPLICATION

This application is based upon and claims the benefit of priority from the prior Japanese Patent Application No. 2008-298694 filed on Nov. 21, 2008, the entire contents of which are incorporated herein by reference.

FIELD

The embodiments discussed herein are related to a correlation processing apparatus obtaining correlation between images and a medium readable by the correlation processing apparatus.

BACKGROUND

In processing for obtaining correlation between images, a correlation processing apparatus calculates the normalized correlation value or the sum of the absolute differences (SAD) value between image pixels under consideration and obtains correlation between the image pixels from the value.

Calculation of the normalized correlation value or SAD value involves calculations on more than one image, which requires a huge amount of computation.

In order to speed up the calculation of the normalized correlation value or SAD value, parallel processing has been adopted in which normalized correlation values for multiple windows are calculated concurrently (See Patent Document 1).
[Patent Document 1] Japanese Laid-Open Patent Publication No. 10-134183

Another type of parallel processing has also been proposed in which a window and a texture are divided into subregions and normalized correlation values for the subregions are calculated concurrently to obtain the normalized correlation value between the texture and the window (See Patent Document 2).
[Patent Document 2] Japanese Laid-Open Patent Publication No. 2008-84034

SUMMARY

According to an aspect of the embodiments, there is provided a correlation processing apparatus that obtains a correlation value between an image to be found and a subimage in an image being searched, the apparatus including: N arithmetic circuits each performing an arithmetic operation on a first image pixel value of a first image pixel of the image to be found and a second image pixel value of a second image pixel of the subimage (where N is a positive integer); a rectangular pattern selection circuit selecting a rectangular pattern that includes Q elements (where Q is a positive integer smaller than N) and by which the image to be found is divided into the smallest number of divisions among a plurality of rectangular patterns; a control circuit activating Q arithmetic circuits among the N arithmetic circuits and identifying Q first image pixel values and Q second image pixel values between which the arithmetic operation is to be performed by the Q arithmetic circuits; and an accumulator accumulating the results of the arithmetic operations performed by the Q arithmetic circuits.

The object and advantages of the embodiments will be realized and attained by means of the elements and combinations particularly pointed out in the claims.

It is to be understood that both the foregoing general description and the following detailed description and are exemplary and explanatory and are not restrictive of the embodiments, as claimed.

BRIEF DESCRIPTION OF DRAWINGS

FIG. 5 is a table for illustrating exemplary selecting operation of the rectangular pattern selection circuit 31;

FIG. 8 illustrates details of selecting operation of a rectangular pattern selection circuit 313;

FIG. 9B illustrates another normalized correlation value processing apparatus 71 according to the fourth embodiment;

DESCRIPTION OF EMBODIMENTS

First to sixth embodiments of the present invention will be described below.

[First Embodiment]

Calculating a normalized correlation or value SAD value between images requires a large amount of computation for the following reasons. First, to find a rectangular subregion (called window) in an image being searched that has a strong correlation with an image to be found (called texture), a normalized correlation value or SAD value between the texture and each of multiple windows needs to be calculated while moving the window location. Second, one texture or window consists of multiple image pixels, and multiple image pixels relating to the multiple windows and texture need to be processed to calculate the normalized correlation value or SAD value, which involves computations on a huge amount of data. Therefore, parallel processing has been adopted in order to speed up calculations of the normalized correlation value or SAD value. In addition to the method of processing windows in parallel as described above, there is a method in which pixels in one window are processed in parallel. The former method is advantageous in terms of memory access efficiency if multiple windows to be processed are located according to a rule. However, if the multiple windows are located randomly, memory addresses to be accessed in parallel are not based on any rule, which make parallel processing difficult. The latter method retains regularity of memory access patterns to a certain degree and ensures parallelism even if windows are randomly located.

Figure 1:
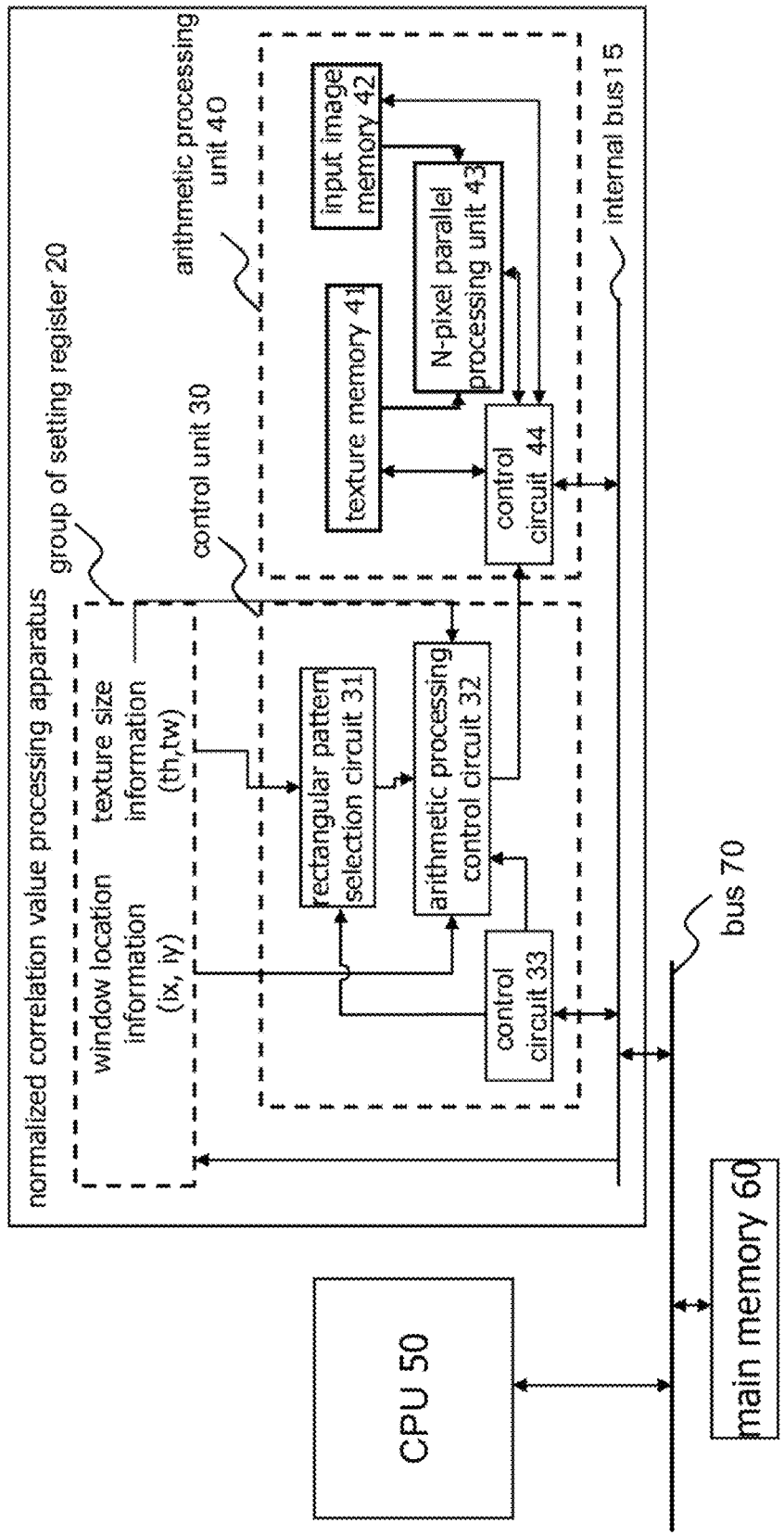
FIG. 1 illustrates a configuration of a normalized correlation value processing apparatus 10 according to an embodiment.

FIG. 1 illustrates a configuration of a normalized correlation value processing apparatus 10 according to an embodiment. Depiction in FIG. 1 is the entire system including the normalized correlation value processing apparatus 10, a CPU 50, a main memory 60, and a bus 70.

The CPU 50 is a controller controlling the normalized correlation value processing apparatus 10 or the main memory 60 in the system.

The main memory 60 is a storage device temporarily storing data used in the system. The main memory 60 temporarily stores data handled between the CPU 50 and the normalized correlation value processing apparatus 10. In response to a request from the CPU 50 or the normalized correlation value processing apparatus 10, data is input in and output from the main memory 60.

The bus 70 consists of a data bus (a set of signal lines used for data signal transfer) interconnecting the normalized correlation value processing apparatus 10, the main memory 60, and the CPU 50 and a bus (a set of signal lines used for instruction signal transfer) carrying control instructions.

The normalized correlation value processing apparatus 10 includes an internal bus 15, a group of setting registers 20, a control unit 30, and an arithmetic processing unit 40 (datapath).

The internal bus 15 includes a data bus transferring input data from the bus 70 and transferring output data onto the bus 70 and a bus transferring control instructions to the control unit 30.

The setting registers 20 include registers storing window location information (iX, iY) and texture size information (th, tw) sent from the CPU 50 through the bus 70 and the internal bus 15. The setting registers 20 may also include registers storing other setting values, for example initial values required for arithmetic processing. Here, a window is a rectangular subregion in an input image (image being searched) and consists of multiple pixels arranged in a matrix (hereinafter the image pixels constituting a window are referred to as window image pixels). A texture is a rectangular image to be found and consists of multiple image pixels arranged in a matrix (hereinafter the image pixels constituting a texture are referred to as texture image pixels). The term image pixel generally refers to a picture element which displays a color corresponding to an RGB value indicating a hue and an alpha value of the color. However, for simplicity, the term pixel as used herein denotes a picture element which displays a shade level corresponding to a one-dimensional value representing a gray-scale level. While the term image pixel value generally refers to an RGB value representing a hue and a value representing opacity, the term image pixel as used herein refers to a one-dimensional value representing a gray-scale level, for simplicity.

Window location information (iX, iY) indicates that the image pixel at the upper left corner of the window coincides with the image pixel in row iX in column iY among the image pixels in the input image (image being searched).

Texture size information (th, tw) indicates that the texture image includes th rows×tw columns.

Figure 2:
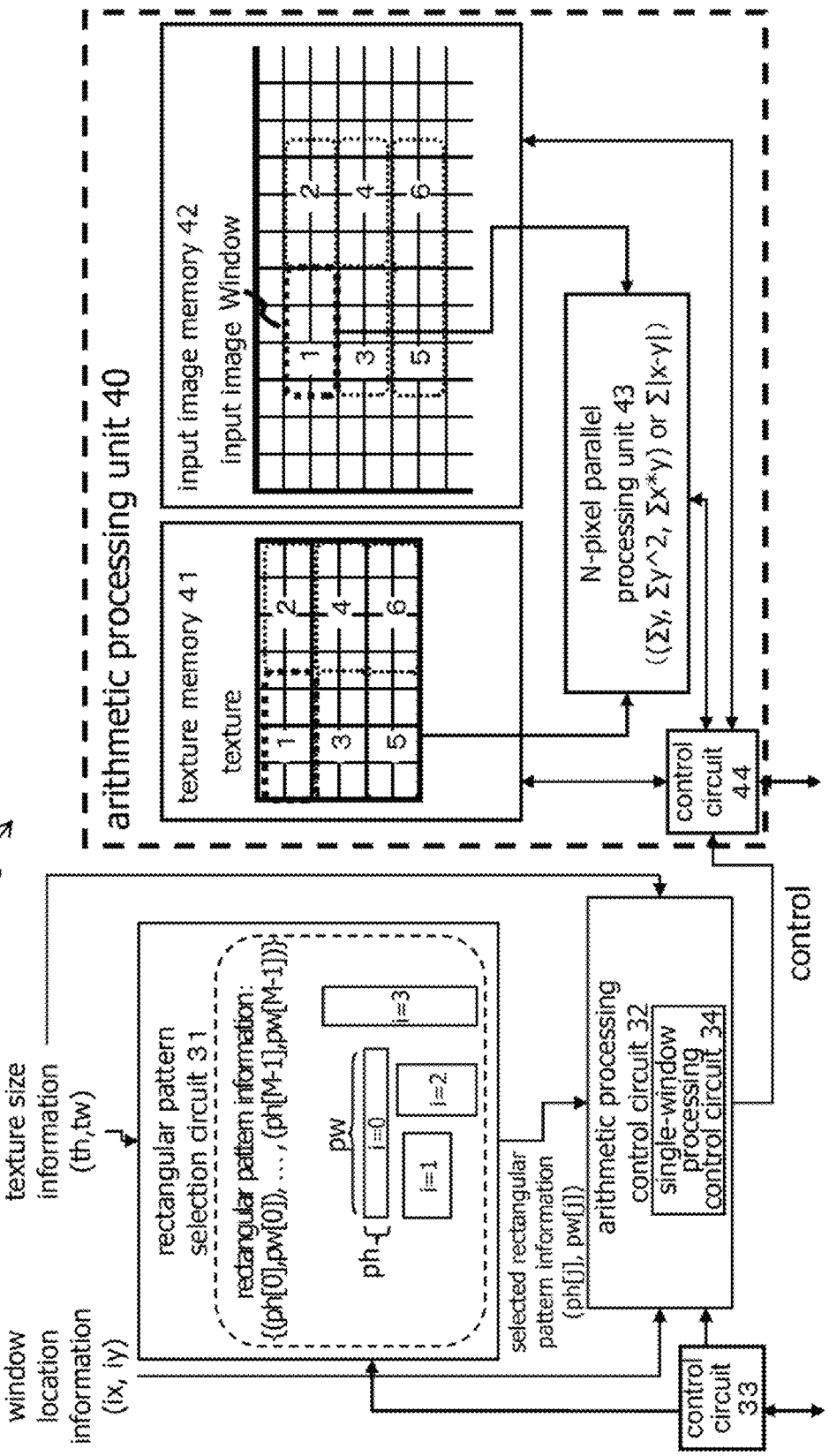
FIG. 2 illustrates a control unit 30 and an arithmetic processing unit (datapath) 40.

FIG. 2 illustrates a control unit 30 and an arithmetic processing unit 40 (datapath).

The control unit 30 includes a rectangular pattern selection circuit 31, an arithmetic processing control circuit 32 (datapath control circuit), and a control circuit 33 controlling these circuits.

The arithmetic processing unit 40 (datapath) includes a texture memory 41, an input image memory 42, an N-pixel parallel processing unit 43, and a control circuit 44 controlling these circuits.

The rectangular pattern selection circuit 31 holds a plurality of sets of rectangular pattern information. The term rectangular pattern as used herein refers to an array pattern of multiple elements arranged in a matrix. The rectangular pattern information indicates the number of rows and columns of a rectangular pattern. For example, a rectangular pattern consisting of two rows and four columns is represented as (2, 4). A plurality (M) of sets of such rectangular pattern information are represented as {(ph[0], pw[0]), (ph[1], pw[1]), (ph[2], pw[2]), (ph[3], pw[3]), ..., (ph[j], pw[j]), ..., (ph[M−1], pw[M−1])}. Here, (ph[j], pw[j]) is a set of rectangular pattern information and subscript j represents the number assigned to each of the plurality (M) of rectangular patterns, where $0 \leq j < M$. Consequently, it is seen that the rectangular pattern includes ph[j] rows and pw[j] columns (where ph[j] and pw[j] are positive integers), that is, ph[j]×pw[j] elements. As will be described with respect to FIG. 3, ph[j]×pw[j] is a positive integer smaller than or equal to the number N of multipliers included in the N-pixel parallel processing unit 43. For example, if N is 9, ph[j] may be 4 and pw[j] may be 2 or ph[j] may be 3 and pw[j] may be 2.

When texture size information (th, tw) is provided to the rectangular pattern selection circuit 31, the rectangular pattern selection circuit 31 selects a rectangular pattern the number of repetitions of which necessary to cover the texture is the smallest among the rectangular patterns the rectangular pattern selection circuit 31 holds. That is, the rectangular pattern selection circuit selects such a rectangular pattern that when the texture is divided into contiguous repetitions of the rectangular pattern, the number of the repetitions is the smallest. The rectangular pattern selection circuit 31 outputs rectangular pattern information of the selected rectangular pattern to the arithmetic processing control circuit (datapath control circuit) 32. The selecting operation of the rectangular pattern selection circuit 31 will be described later in detail with respect to FIG. 4.

The arithmetic processing control circuit (datapath control circuit) 32 controls arithmetic processing performed in the arithmetic processing unit 40. The arithmetic processing control circuit (datapath control circuit) 32 includes a single-window processing control circuit 34. The arithmetic processing control circuit (datapath control circuit) 32 causes the single-window processing control circuit 34 to operate on the basis of rectangular pattern information of the selected rectangular pattern, thereby controlling the arithmetic processing unit 40 to perform arithmetic processing in a single window. Then the arithmetic processing control circuit (datapath control circuit) 32 receives window location information (ix, iy) from the CPU 50 and controls, on the basis of the window location information, the arithmetic processing unit 40 to perform arithmetic processing in the next window. The control operation of the arithmetic processing control circuit (datapath control circuit) 32 will be described in detail later with respect to FIG. 6.

The control circuit 33 controls the timing of start of operation of the rectangular pattern selection circuit 31 and the arithmetic processing control circuit (datapath control circuit) 32 and reception and transmission of information and data.

The texture memory 41 stores texture image pixel values transmitted from the CPU 50 through the bus 70 and the internal bus 15.

The input image memory 42 stores image pixel values of an input image (image being searched) which are transmitted from the CPU 50 through the bus 70 and the internal bus 15.

The N-pixel parallel processing unit 43 includes a plurality of multipliers, an adder, and an accumulator register. However, a plurality of such sets, each consisting of a plurality of multipliers, an adder, and an accumulator, may be provided. The N-pixel parallel processing unit 43 will be described in detail later with respect to FIG. 3.

The control circuit 44 controls, under the control of the arithmetic processing control circuit (datapath control circuit) 32, input and output of data to and from the texture memory 41 and the input image memory 42 and output of data from the N-pixel parallel processing unit 43 onto the internal bus 15.

Figure 3:
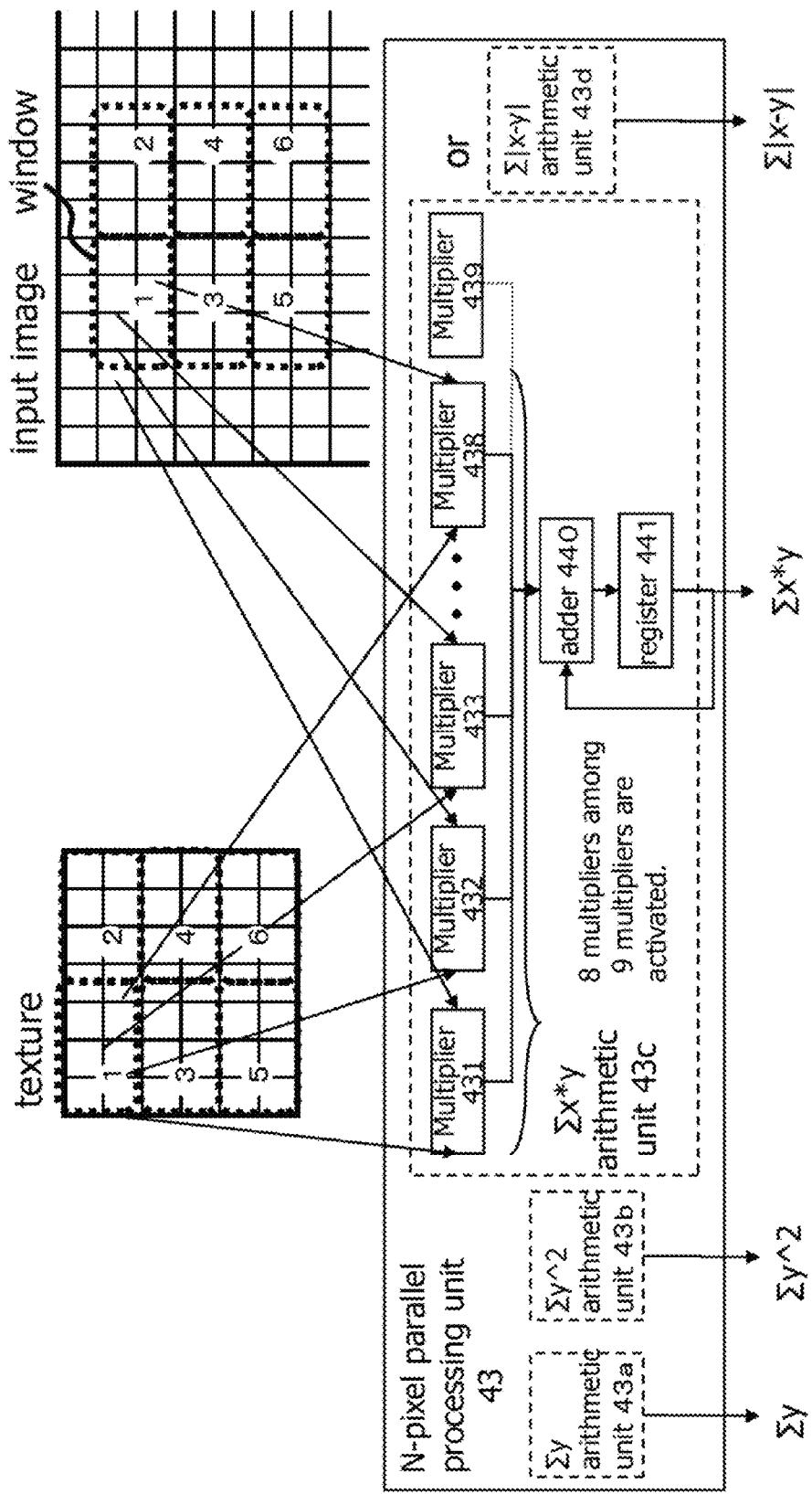
FIG. 3 illustrates details of an N-pixel parallel processing unit 43.

FIG. 3 illustrates details of the N-pixel parallel processing unit 43. Depiction in FIG. 3 are a texture stored in the texture memory 41, an input image (image being searched) stored in the input image memory 42, a window location, and circuit elements constituting the N-pixel parallel processing unit 43.

If the N-pixel parallel processing unit 43 is configured to obtain normalized correlation values, the N-pixel parallel processing unit 43 includes a Σy arithmetic unit 43a, a Σy*y arithmetic unit 43b, and a ΣX*Y arithmetic unit 43c. If the N-pixel parallel processing unit 43 is configured to obtain SAD values, the N-pixel parallel processing unit 43 includes a Σ|x−y| arithmetic unit 43d.

The Σy arithmetic unit 43a adds the image pixel values (y) of all the image pixels in a rectangular pattern associated with a window together (Σy). The Σy arithmetic unit 43a includes N registers, where N is greater than or equal to ph×pw, and an adder and a register storing the result of the addition. As many registers as the number of image pixels ph×pw in a selected rectangular pattern are activated. That is, the registers of the Σy arithmetic unit 43a are configurable according to the selected rectangular pattern.

The Σy*y arithmetic unit 43b squares the window image pixel value (y) of each image pixel in a rectangular pattern associated with a window and adds the squares obtained for all image pixels in the rectangular pattern together (Σy*y). The Σy*y arithmetic unit 43b includes N squaring circuits, where N is greater than or equal to ph×pw, an adder, and a register for storing the result of the addition. As many squaring circuits as the number of image pixels ph×pw in a selected rectangular pattern are activated. That is, the squiring circuits of the Σy*y arithmetic unit 43b are configurable according to the selected rectangular pattern.

The ΣX*Y arithmetic unit 43c multiplies the texture image pixel value (x) of each texture image pixel in a rectangular pattern associated with a texture by the window image pixel value (y) of the corresponding window image pixel in the rectangular pattern associated with a window (x*y) and adds the products (x*y) obtained for all the image pixels in the rectangular pattern together (ΣX*Y). The ΣX*Y arithmetic unit 43c includes N multipliers, where N is greater than or equal to ph×pw, an adder, and a register for storing the result of the addition. As many multipliers as the number of image pixels ph×pw in a selected rectangular pattern are activated. That is, the multipliers of the ΣX*Y arithmetic unit 43c are configurable according to the selected rectangular pattern.

The Σ|x−y| arithmetic unit 43d subtracts the window image pixel value (y) of each window pixel in a rectangular pattern associated with a window from the texture image pixel value (x) of the corresponding texture image pixel in the rectangular pattern associated with a texture and adds the absolute values |x−y| of the differences obtained for all image pixels in the rectangular pattern together (Σ|x−y|). The Σ|x−y| arithmetic unit 43d includes N subtractors, where N is greater than or equal to ph×pw, an adder, and a register for storing the result of the addition. As many subtractors as the number of image pixels ph×pw in a selected rectangular pattern are activated. That is, the subtractors of the Σ|x−y| arithmetic unit 43d are configurable according to the selected rectangular pattern.

In the example in FIG. 3, the texture consists of 6 rows×7 columns of image pixels. The window also consists of 6 rows×7 columns of image pixels. The rectangular pattern selected by the rectangular pattern selection circuit 31 consists of 2 rows×4 columns. The window or texture is covered with 6 repetitions of the rectangular pattern.

The ΣX*Y arithmetic unit 43c in the example includes nine multipliers 431 to 439, an adder 440 connected to the nine multipliers 431 to 439, and a register 441. As indicated by solid lines in FIG. 3, eight multipliers 431 to 438 are activated in accordance with the 2×4 rectangular pattern. As indicated by a dotted line in FIG. 3, multiplier 439 is not activated. That is, connections between the adder 440 and the multipliers 431 to 439 are reconfigured according to the rectangular pattern.

The configurations of the Σy arithmetic unit 43a, the Σy*y arithmetic unit 43b, and the Σ|x−y| arithmetic unit 43d are the same as that of the ΣX*Y arithmetic unit 43c, except that the multipliers of the ΣX*Y arithmetic unit 43c are replaced with the registers, squaring circuits, and subtractors, respectively.

Figure 4:
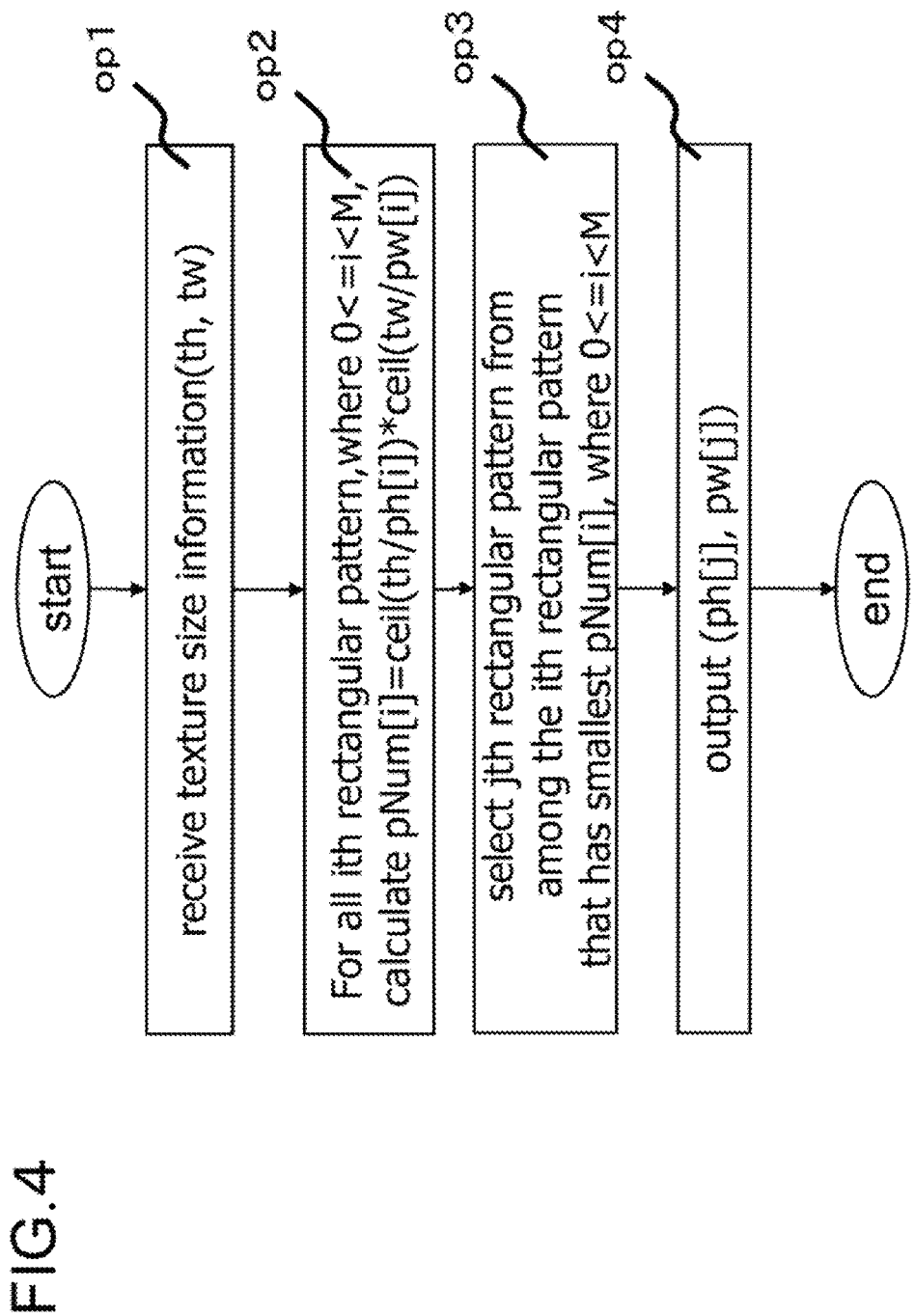
FIG. 4 illustrates selecting operation of a rectangular pattern selection circuit 31.

FIG. 4 is a flowchart illustrating details of selecting operation of the rectangular pattern selection circuit 31.

Here, the rectangular pattern selection circuit 31 holds possible sets of information of all rectangular patterns {(ph[0], pw[0]), (ph[1], pw[1]), (ph[2], pw[2]), (ph[3], pw[3]), . . . , (ph[j], pw[j]), . . . , (ph[M−1], pw[M−1])} which is determined by the configuration of the N-pixel parallel processing unit 43.

At operation (op1), the rectangular pattern selection circuit 31 receives texture size information (th, tw).

At operation (op2), the following operation is performed for all rectangular patterns held by the rectangular pattern selection circuit 31, namely the rectangular patterns 0 to (M−1). First, calculation of ceil (th/ph) is performed in which the height th of the texture is divided by the height ph of the rectangular pattern and the quotient is rounded up to the next higher integer. Then, calculation of ceil (tw/pw) is performed in which the width tw of the texture is divided by the width pw of the rectangular pattern and the quotient is rounded up to the nearest whole number. Then, ceil (th/ph) is multiplied by ceil (tw/pw) to obtain pNum, which represents the smallest number of repetitions of the selected rectangular pattern necessary for covering the given texture with the selected rectangular pattern. In other words, pNum is the smallest number of divisions of the texture by the rectangular pattern.

Depending on the relationship between the rectangular pattern and the shape of the texture or window, part of the rectangular pattern covering the texture or window may extend off a boundary of the texture or window. However, because the quotient is rounded up to the nearest whole number, the area that extends off the boundary is minimized.

PNum in the example illustrated in FIG. 3 is calculated as follows. First, ceil (th/ph)=6/2=3. Then, Ceil (tw/pw)=2 because tw/pw=7/4=1.75, which is rounded up to 2. Thus, the number of repetitions of the rectangular pattern required for covering the texture, ceil (tw/pw)×ceil (th/ph)=6, is obtained as depicted in FIG. 3.

At operation (op3), the rectangular pattern that has the smallest pNum among the rectangular patterns i (where 0≦i<M) is selected.

At operation (op4), information concerning the selected rectangular pattern is output to the arithmetic processing (datapath) control circuit 32.

FIG. 5 is a table illustrating selecting operation of the rectangular pattern selection circuit 31. In the example, the texture sizes (th, tw) input from the CPU 50 are 10×4, 10×5, 10×6, and 64×64. The rectangular patterns (ph, pw) held by the rectangular pattern selection circuit 31 are a 1×9 rectangular pattern 0, a 2×4 rectangular pattern 1, a 3×3 rectangular pattern 2, a 4×2 rectangular pattern 3, and a 9×1 rectangular pattern 4.

For each texture size, pNum=ceil (tw/pw)×ceil (th/ph) of each rectangular pattern is calculated as given below.

For textures size (10, 4), pNum of rectangular patterns 0, 1, 2, 3, and 4 are 10, 5, 8, 6, and 8, respectively. Therefore, rectangular pattern selection circuit 31 selects the 2×4 rectangular pattern 1.

For textures size (10, 5), pNum of rectangular patterns 0, 1, 2, 3, and 4 are 10, 10, 8, 9, and 10, respectively. Therefore, rectangular pattern selection circuit 31 selects the 3×3 rectangular pattern 2.

For texture size (10, 6), pNum of rectangular patterns 0, 1, 2, 3, and 4 are 10, 10, 8, 6, and 8, respectively. Therefore, the rectangular pattern selection circuit 31 selects the 4×2 rectangular pattern 3.

For texture size (64, 64), pNum of rectangular patterns 0, 1, 2, 3, and 4 are 512, 512, 484, 512, and 512, respectively. Therefore, the rectangular pattern selection circuit 31 selects the 3×3 rectangular pattern 2.

Figure 6:
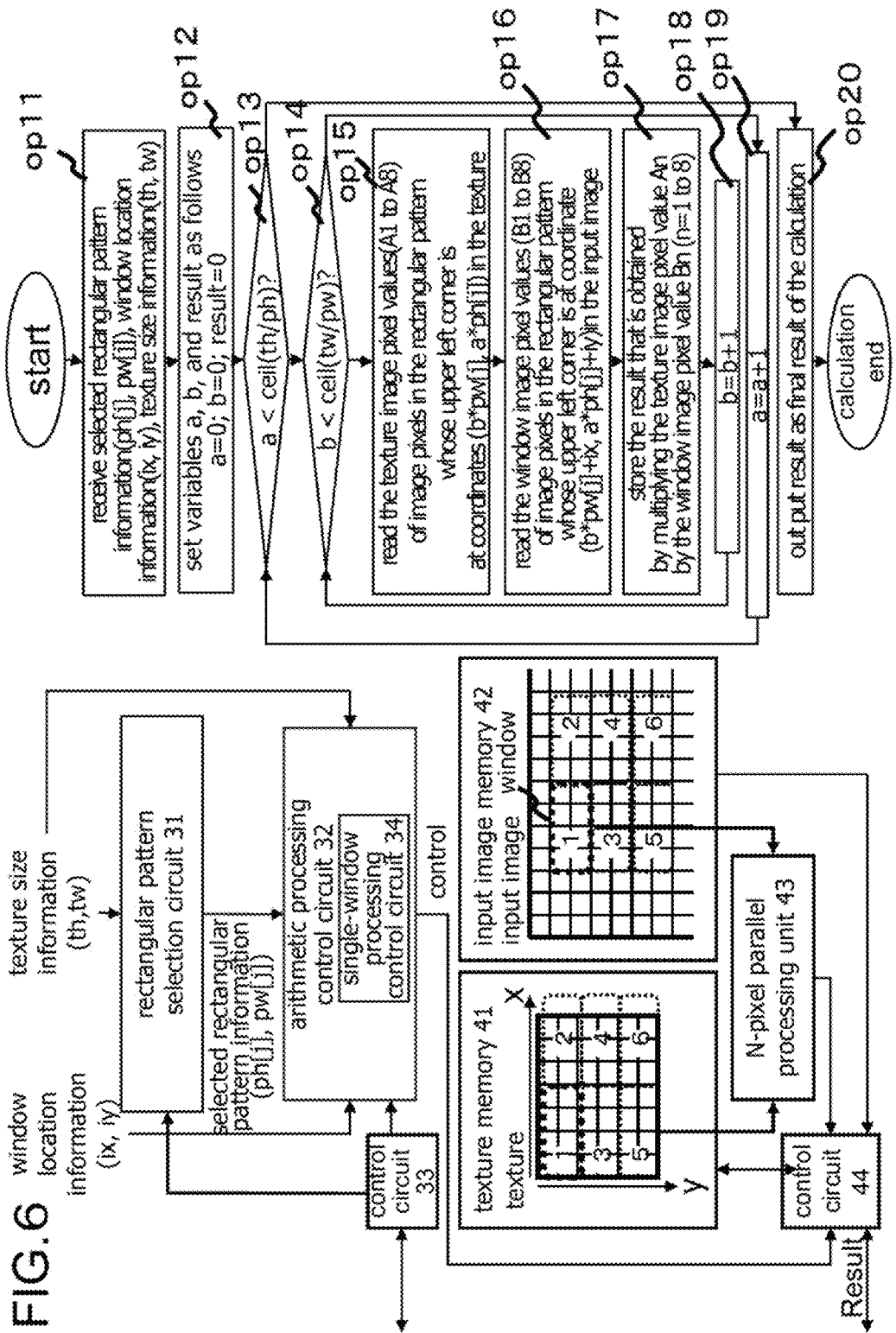
FIG. 6 illustrates details of control operation of an arithmetic processing control circuit (datapath control circuit) 32.

FIG. 6 illustrates details of control operation of the arithmetic processing control circuit (datapath control circuit) 32. FIG. 6 shows a flowchart of the control operation of the arithmetic processing control circuit (datapath control circuit) 32 and a block diagram depicting the rectangular pattern selection circuit 31, arithmetic processing control circuit 32, control circuit 33, texture memory 41, input image memory 42, N-pixel parallel processing unit 43, and control circuit 44.

The arithmetic processing control circuit (datapath control circuit) 32 controls the N-pixel parallel processing unit 43 depicted in FIG. 3 as described below. The arithmetic processing control circuit (datapath control circuit) 32 includes a single-window processing control circuit 34.

At operation (op11), the arithmetic processing control circuit (datapath control circuit) 32 obtains the selected rectangular pattern information (ph, pw) from the rectangular pattern selection circuit 31 and obtains window location information (ix, iy) and texture information (th, tw) from the CPU 50.

At operation (op12) the arithmetic processing control circuit (datapath control circuit) 32 initializes variables used in calculations through the single-window processing control circuit 34. For example, the arithmetic processing control circuit (datapath control circuit 32) sets variables a and b representing the number of iterative calculations to zero and stores 0 in an accumulator register "result". The arithmetic processing control circuit (datapath control circuit 32) controls, through the control circuit 44, the number of multipliers, registers, squaring circuits, and subtractors to be activated in the Σy arithmetic unit 43a, the Σy*y arithmetic unit 43b, the ΣX*Y arithmetic unit 43c, and the Σ|x−y| arithmetic unit 43d according to the number of image pixels in the selected rectangular pattern. That is, the configuration of the arithmetic units (multipliers, registers, squaring circuits, and subtractors) in the N-pixel parallel processing unit 43 may be changed (configurable) according to the selected rectangular pattern.

For example, the ΣX*Y arithmetic unit 43c includes an adder 440, multipliers 431, 432, 433, 434, 435, 436, 437, 438 and 439 connected in parallel to the adder 440, and a register 441 receiving an output from the adder 440. Note that ceil (th/ph) is 3 and ceil (tw/pw) is 2.

Accordingly, the control circuit 44 sets 0 in the register 441 under the control of the arithmetic processing control circuit (datapath control circuit) 32. The control circuit 44 also activates the multipliers 431 to 438 and assigns the multipliers 431 to 438 to relevant ones of the image pixels in the rectangular pattern.

At operation (op13), the arithmetic processing control circuit (datapath control circuit) 32 determines whether the value of variable a is less than ceil (th/ph). If the value of variable a is greater than or equal to ceil (th/ph), the process proceeds to operation (op20). On the other hand, if the value of variable a is less than ceil (th/ph), the process proceeds to operation (op14).

At operation (op14), the arithmetic processing control circuit (datapath control circuit) 32 determines whether the value of variable b is less than ceil (tw/pw). If the value of variable b is greater than or equal to ceil (tw/pw), the process proceeds to operation (op19). On the other hand, if the value of variable b is less than ceil (tw/pw), the process proceeds to operation (op15).

At operation (op15), the arithmetic processing control circuit (datapath control circuit) 32 controls the control circuit 44 to read the texture image pixel values of image pixels in the rectangular pattern whose upper left corner is at coordinates (b*pw[j], a*ph[j]) in the texture, that is, the rectangular pattern in location 1 in the texture, from the texture memory 41 as values A1 to A8 to be input in the ΣX*Y arithmetic unit 43c. The arithmetic processing control circuit (datapath control circuit) 32 controls the control circuit 44 so that 0 is input as values A1 to A8 for portions of the rectangular pattern that extend off the texture.

At operation (op16), the arithmetic processing control circuit (datapath control circuit) 32 controls the control circuit 44 to read the window image pixel values of image pixels in the rectangular pattern whose upper left corner is at the coordinate (b*pw[j]+ix, a*ph[j]+iy) in the input image, that is, the window image pixel values of the pixels in the rectangular pattern in location 1 in the window, from the input image memory 42 as values B1 to B8 to be input in the ΣX*Y arithmetic unit 43c.

At operation (op17), the arithmetic processing control circuit (datapath control circuit) 32 controls the control circuit 44 to input the pixel values A1 to A8 and B1 to B8 into the multipliers 431 to 438 of the ΣX*Y arithmetic unit 43c. Then, the control circuit 44 controls the multipliers 431 to 438 to multiply the texture image pixel values A1 to A8 by the window image pixel values B1 to B8, respectively, in parallel. The results are input into the adder 440 from the multipliers 431 to 438 and the control circuit 44 controls the adder 440 to add the values input from the multiplier 431 to 438 in turn to the value stored in the register 441, so that the sum is output to the register 441. As a result, all the values provided by the eight multipliers 431 to 438 are added up together and accumulated in the register 441. The arithmetic processing control circuit (datapath control circuit) 32 controls the control circuit 44 to store the result in the register 441 to "result".

At operation (op18), the arithmetic processing control circuit (datapath control circuit) 32 adds 1 to variable b and then performs operation (op14). That is, the arithmetic processing control circuit (datapath control circuit) 32 controls the control circuit 44 to cause the ΣX*Y arithmetic unit 43c to perform the same operation on the rectangular pattern located in location 2.

At operation (op19), the arithmetic processing control circuit (datapath control circuit) 32 adds 1 to variable a and then performs operation (op13). In this way, the arithmetic processing control circuit (datapath control circuit) 32 causes the ΣX*Y arithmetic unit 43c to perform the same operation on the rectangular patterns in locations 3, 4, 5, and 6 in turn through the control circuit 44.

As a result, the final result of the calculation of Σx*y on the first window is stored in "result" at operation (op20). This will end the calculation of the correlation element value Σx*y.

To obtain a normalized correlation value, correlation element values Σy and Σy*y for each window are required in addition to the correlation element value Σx*y. These values are calculated by the Σy arithmetic unit 43a and the Σy*y arithmetic unit 43b, respectively.

Then the N-pixel parallel processing unit 43, controlled by the arithmetic processing control circuit (datapath control circuit) 32 through the control circuit 43, performs the same processing on windows in different locations. Ultimately, the calculations on all windows in the input image are completed.

Then, the CPU 50 substitutes the correlation element values Σx*y, Σy*y, and Σy obtained for each window into the following equation $$r^2 = \{n \times \Sigma x^* y - \Sigma y \times \Sigma x\}^2 / \{n \times \Sigma y^* y - (\Sigma y)^2\} / \{n \times \Sigma x^* x - (\Sigma x)^2\}$$

to obtain the correlation value r.

Here, n is the number of texture image pixels constituting the texture, Σx is the correlation element value which is defined as the sum of the texture image pixel values, and Σx*x is the correlation element value which is defined as the sum of squares of the texture image pixel values. Since the texture is a predetermined image, the correlation element values Σx and Σx*x may be calculated beforehand.

On the basis of the correlation value r, the CPU 50 may determine whether or not each window in the input image (image being searched) matches the texture (image to be found).

In summary, the normalized correlation value processing apparatus 10 according to the first embodiment that obtains a correlation value between a texture (image to be found) and a window (rectangular subimage) in an input image (image being searched) includes:

N arithmetic circuits (multipliers 431 to 439, where N is a positive integer) each performing an arithmetic operation on a texture image pixel value of an image pixel of the texture and a window image pixel value of an image pixel of the window;

a rectangular pattern selection circuit (rectangular pattern selection circuit 31) selecting a rectangular pattern that includes Q=ph×pw elements arranged in a matrix of ph rows and pw columns (where Q is a positive integer smaller than N and ph and pw are positive integers) and by which the texture is divided into the smallest number of divisions among a plurality of rectangular patterns;

a control circuit (arithmetic processing control circuit 32) activating Q arithmetic circuits among the N arithmetic circuits, controlling the Q arithmetic circuits to read texture image pixel values of pixels in a rectangular pattern in location 1 in the texture from a texture memory 41 as values to be input, and controlling the Q arithmetic circuits to read window image pixel values B1 to B8 of pixels in the rectangular pattern in location 1 in the window from an input image memory 42; and an accumulator (an adder 440 and a register 441) accumulating the results of the arithmetic operations performed by the Q arithmetic circuits.

The normalized correlation value processing apparatus 10 described above is capable of selecting an optimum rectangular pattern by which the texture and window may be divided into the smallest number of divisions even if the setting of texture size is changed. Furthermore, by activating as many arithmetic circuits as the number of the elements of the rectangular pattern, the arithmetic circuits may be reconfigured according to the rectangular pattern so that calculations on a plurality of elements in the rectangular pattern may be performed in parallel by the activated arithmetic circuits. The results of the calculations by the activated arithmetic circuits may be added up to obtain correlation element values for obtaining a correlation value.

Unlike in window parallel processing, the locations of the windows to be processed in parallel do not need to be predetermined because a rectangular pattern is set in each window and the elements in the rectangular pattern are processed in parallel. Thus, window locations may be flexibly set.

Therefore, the normalized correlation value processing apparatus 10 has a configuration capable of efficient parallel processing for calculating correlation between a texture and a window in applications that require flexibility of setting of texture size and window location.

The arithmetic circuits in the normalized correlation value processing apparatus 10 may be any of registers, multipliers, and subtractors. Therefore, normalized correlation value processing apparatus 10 is capable of calculating any type of correlation element value.

The normalized correlation value processing apparatus 10 further includes a group of registers holding texture size information concerning the size of a texture and window location information concerning the location of a window. The rectangular pattern selection circuit (rectangular pattern selection circuit 31) selects an optimum rectangular pattern on the basis of the texture size information. The control circuit (arithmetic processing control circuit 32) is also capable of identifying the location of a window in an input image on the basis of the window location information.

The normalized correlation value processing apparatus 10 preferably includes a memory (texture memory 41) storing a texture and a memory (input image memory 42) storing an input image.

Because the group of registers, the texture memory 41 and the input image memory 42 are provided independently of the CPU 50, the speeds with which initial values are set and image pixels are input in the arithmetic circuits are increased as compared with conventional methods. Furthermore, because the function of identifying window locations in an input image is provided in the control circuit (arithmetic processing control circuit 32) independently of the CPU 50, the control capacity of the CPU 50 may be saved and the speed of determination by the CPU 50 may be increased.

In the foregoing, an optimum rectangular pattern is selected based on the criterion that a texture and window may be divided with the smallest number of repetitions. However, the speed with which texture image pixel values of the image pixels constituting a texture or the window image pixel values of the image pixels constituting a window are read from the texture memory 41 or the input image memory 42 in accordance with the elements of a rectangular pattern may vary depending on the shape of the rectangular pattern. An optimum rectangular pattern may be selected by taking into consideration the speed with which image pixel values are read. An example will be described as a second embodiment.

[Second Embodiment]

A normalized correlation value processing apparatus according to the second embodiment includes a rectangular pattern selection circuit 312 in place of the rectangular pattern selection circuit 31 of the first embodiment.

Figure 7:
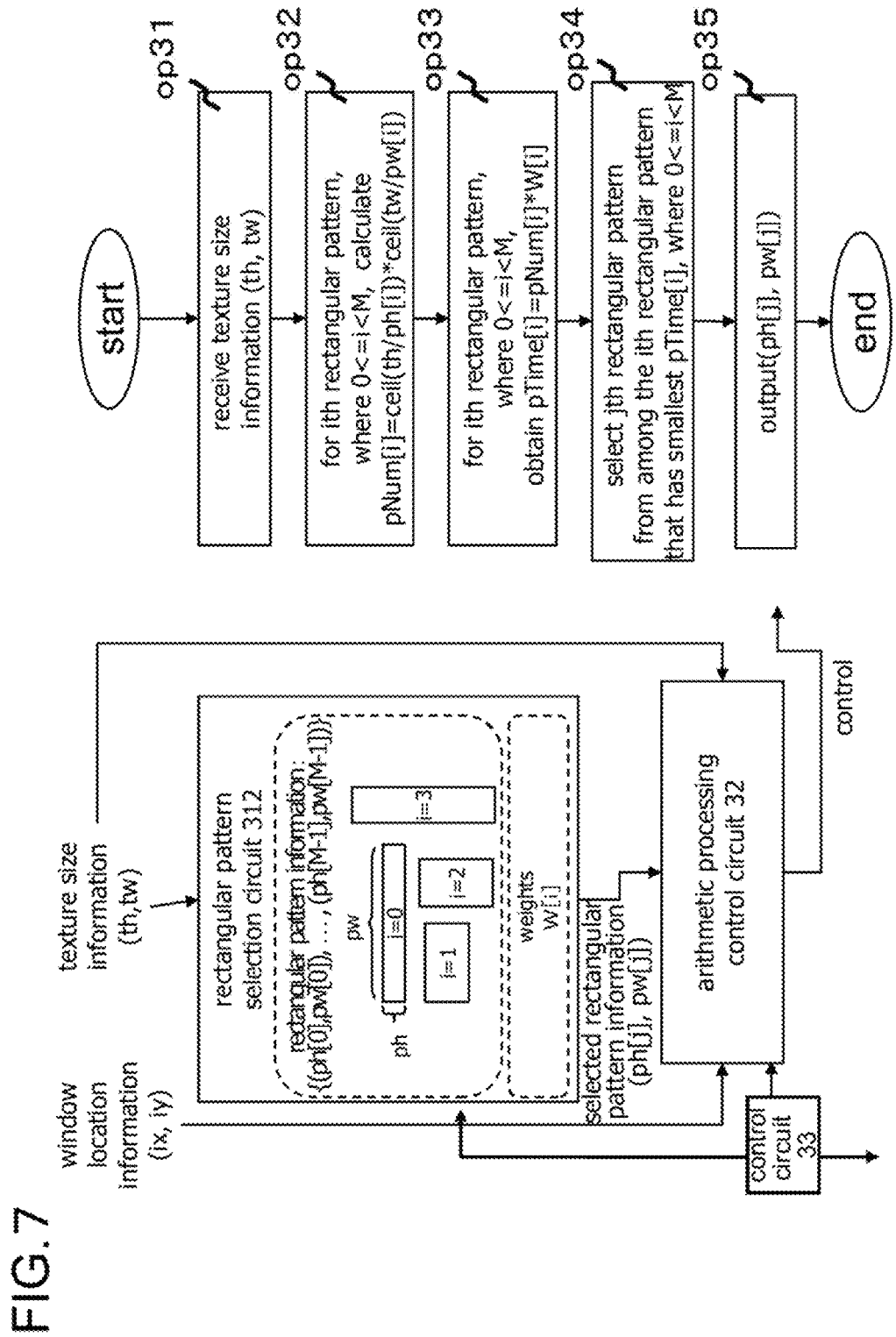
FIG. 7 illustrates details of selecting operation of a rectangular pattern selection circuit 312.

FIG. 7 illustrates selecting operation by the rectangular pattern selection circuit 312 in detail. Depiction in FIG. 7 are the rectangular pattern selection circuit 312, a control circuit 33, and an arithmetic processing control circuit 32 as well as a flowchart illustrating selecting operation by the rectangular pattern selection circuit 312. The control circuit 33 and the arithmetic processing control circuit 32 are the same as the control circuit 33 and the arithmetic processing control circuit 32 of the first embodiment and therefore the description of these circuits will be omitted.

The rectangular pattern selection circuit 312 holds weights (W[i]) to be assigned to rectangular patterns by taking into consideration the speed with which texture image pixel values and window image pixel values for elements in each rectangular pattern are read from a texture memory 41 and input image memory 42. The rectangular pattern selection circuit 312 also holds possible sets of information of all rectangular patterns {(ph[0], pw[0]), (ph[1], pw[1]), (ph[2], pw[2]), (ph[3], pw[3]), ..., (ph[j], pw[j]), ..., (ph[M−1], pw[M−1])} which are determined by the configuration of the N-pixel parallel processing unit 43. The arithmetic processing control circuit 32 and the control circuit 33 are the same as the equivalents labeled with the same reference numerals in the first embodiment and therefore the description of these circuits will be omitted.

At operation (op31), the rectangular pattern selection circuit 312 receives texture size information (th, tw).

At operation (op32), the same operation as operation opt in the flowchart of FIG. 4 is performed for all rectangular patterns 0 to (M−1) held by the rectangular pattern selection circuit 312. That is, arithmetic operations ceil (th[i]/ph[i]) and ceil (tw[i]/pw[i]) are performed. Then, ceil (th[i]/ph[i]) is multiplied by ceil (tw[i]/pw[i]) to obtain pNum[i] for all rectangular patterns i, where i is a positive integer between or equal to 0 and M−1.

At operation (op33), pNum[i] is multiplied by W[i] to obtain pTime[i], where W[i] is a positive integer that decreases with increasing readout speed. For example, W[i] is greater than 0 and less than or equal to 1. In general, the readout speed is likely to be higher in the column direction in a memory arrangement of a typical memory used as the texture memory 41 or the input image memory 42 and lower in the row direction. Accordingly, smaller weights (W[i]) may be assigned to rectangular patterns that include a higher percentage of elements corresponding to image pixel values to be read in the column direction in the memory from which the image pixel values of elements of the rectangular patterns are read. Here, higher readout speed means shorter time between the moment a memory access request is initiated and the moment the image pixel values relating to a rectangular pattern are obtained.

At operation (op34), a rectangular pattern is selected that has the smallest pTime among the rectangular patterns i (where 0≦i<M).

At operation (op35), information about the selected rectangular pattern is output to the arithmetic processing (datapath) control circuit 32.

In summary, the normalized correlation value processing apparatus according to the second embodiment that obtains a correlation value between a texture (image to be found) and a window (rectangular sub-image) in an input image (image being searched) includes:

N arithmetic circuits (multipliers 431 to 439, where N is a positive integer) each performing an arithmetic operation on a texture image pixel value of am image pixel of the texture and a window image pixel value of an image pixel of the window;

a texture memory storing the texture image pixel value;

an input image memory storing the window image pixel value;

a rectangular pattern selection circuit (rectangular pattern selection circuit 31) selecting a rectangular pattern that includes Q=ph×pw elements arranged in a matrix of ph rows and pw columns (where Q is a positive integer smaller than N and ph and pw are positive integers) and yields the smallest product of the number of divisions into which the texture is divided by the rectangular pattern and a weight according to the speed with which the texture image pixel values are read from the texture memory or the speed with which the window image pixel values are read from the input image memory among a plurality of rectangular patterns;

a control circuit (arithmetic processing control circuit 32) activating Q arithmetic circuits among the N arithmetic circuits, controlling the Q arithmetic circuits to read the texture image pixel values of pixels in a rectangular pattern in location 1 in the texture from a texture memory 41 as values A1 to A8 to be input and controlling the Q arithmetic circuits to read window image pixel values B1 to B8 of pixels in the rectangular pattern in location 1 in the window from an input image memory 42; and an accumulator (an adder 440 and a register 441) accumulating the results of the arithmetic operations performed by the Q arithmetic circuits.

Therefore, like the normalized correlation value processing apparatus according to the first embodiment, the normalized correlation value processing apparatus according to the second embodiment has a configuration capable of efficient parallel processing for calculating correlation between a texture and a window in applications that require flexibility of setting of texture size and window location.

Furthermore, the normalized correlation value processing apparatus according to the second embodiment is capable of parallel processing more efficiently than the normalized correlation value processing apparatus according to the first embodiment because the normalized correlation value processing apparatus according to the second embodiment selects a rectangular pattern by taking into consideration the speed with which the texture image pixel values are read from the texture memory or the speed with which the window image pixel values are read from the input image memory in addition to the condition that the number of divisions of the texture by the rectangular pattern is smallest.

In the first and second embodiments, the rectangular pattern selection circuit calculates the number of divisions of a texture for all rectangular patterns it holds. However, the calculation takes much time. Therefore, if the upper limit texture size is predetermined, optimum rectangular patterns for different textures may be calculated beforehand and listed in a table. When texture information is input into the rectangular pattern selection circuit, the table may be used to select an optimum rectangular pattern. An example will be described as a third embodiment.

[Third Embodiment]

A normalized correlation value processing apparatus according to the third embodiment includes a rectangular pattern selection circuit 313 in place of the rectangular pattern selection circuit 31 of the first embodiment.

FIG. 8 illustrates selecting operation performed by the rectangular pattern selection circuit 313 in detail. Depiction in FIG. 8 are the rectangular pattern selection circuit 313, a control circuit 33, and an arithmetic processing control circuit 32 as well as a flowchart illustrating the selecting operation performed by the rectangular pattern selection circuit 313. The control circuit 33 and the arithmetic processing control circuit 32 are the same as the control circuit 33 and the arithmetic processing control circuit 32 of the first embodiment and therefore the description thereof will be omitted.

The rectangular pattern selection circuit 313 holds possible sets of information of all rectangular patterns {(ph[0], pw[0]), (ph[1], pw[1]), (ph[2], pw[2]), (ph[3], pw[3]), . . . , (ph[j], pw[j]), . . . , (ph[M−1], pw[M−1])} which are determined by the configuration of the N-pixel parallel processing unit 43. The rectangular pattern selection circuit 313 also holds a selection table that lists optimum rectangular patterns associated with all texture sizes in the range from possible minimum to maximum texture sizes. Here, the optimum rectangular patterns may be the ones that may divide a texture with the smallest number of repetitions as in the first embodiment or the ones that yield the smallest product of the number of divisions and a weight according to readout speed as in the second embodiment. If there is another parameter to be considered, the optimum rectangular patterns may be the ones that yield the smallest product of the number of divisions, weight, and a coefficient according to the parameter. The parameter to be considered may be the number of blank elements of a rectangular pattern when the texture is divided by the rectangular pattern.

At operation (op41), the rectangular pattern selection circuit 313 receives texture information (th, tw).

At operation (op42), the rectangular pattern selection circuit 313 selects an optimum rectangular pattern from the selection table describe above.

At operation (op43), the rectangular pattern selection circuit 313 outputs information about the selected rectangular pattern to the arithmetic processing (datapath) control circuit 32.

In summary, the normalized correlation value processing apparatus according to the third embodiment that obtains a correlation value between a texture (image to be found) and a window (rectangular subimage) in an input image (image being searched) includes:

N arithmetic circuits (multipliers 431 to 439, where N is a positive integer) each performing an arithmetic operation on a texture image pixel value of an image pixel of the texture and a window image pixel value of an image pixel of the window;

a rectangular pattern selection circuit (rectangular pattern selection circuit 313) having a selection table listing a rectangular pattern that includes Q=ph×pw elements arranged in a matrix of ph rows and pw columns (where Q is a positive integer smaller than N and ph and pw are positive integers) and selecting a rectangular pattern associated with the size of the texture from the selection table;

a control circuit (arithmetic processing control circuit 32) activating Q arithmetic circuits among the N arithmetic circuits, controlling the Q arithmetic circuits to read texture image pixel values of pixels in a rectangular pattern in location 1 in the texture from a texture memory 41 as values to be input, and controlling the Q arithmetic circuits to read window image pixel values of pixels in the rectangular pattern in location 1 in the window from an input image memory 42 as values B1 to B8 to be input; and an accumulator (an adder 440 and a register 441) accumulating the results of the arithmetic operations performed by the Q arithmetic circuits.

Therefore, like the normalized correlation value processing apparatus according to the first embodiment, the normalized correlation value processing apparatus according to the third embodiment has a configuration capable of efficient parallel processing for calculating correlation between a texture and a window in applications requiring flexibility of setting of texture size and window location.

Furthermore, the time required for parallel processing in the normalized correlation value processing apparatus according to the third embodiment is shorter than that in the first normalized correlation value processing apparatus according to the first embodiment because the time required for selecting an optimum rectangular pattern is reduced.

In the first, second and third embodiment, each time the window is moved, the window location is set on the basis of information from the CPU 50. However, the arithmetic processing control circuit may receive a plurality of sets of window location information at a time. In this case, the normalized correlation value processing apparatus is capable of parallel processing of multiple windows in addition to parallel processing of elements of a rectangular pattern described above. An example will be described as a fourth embodiment.

[Fourth Embodiment]

Figure 9A:
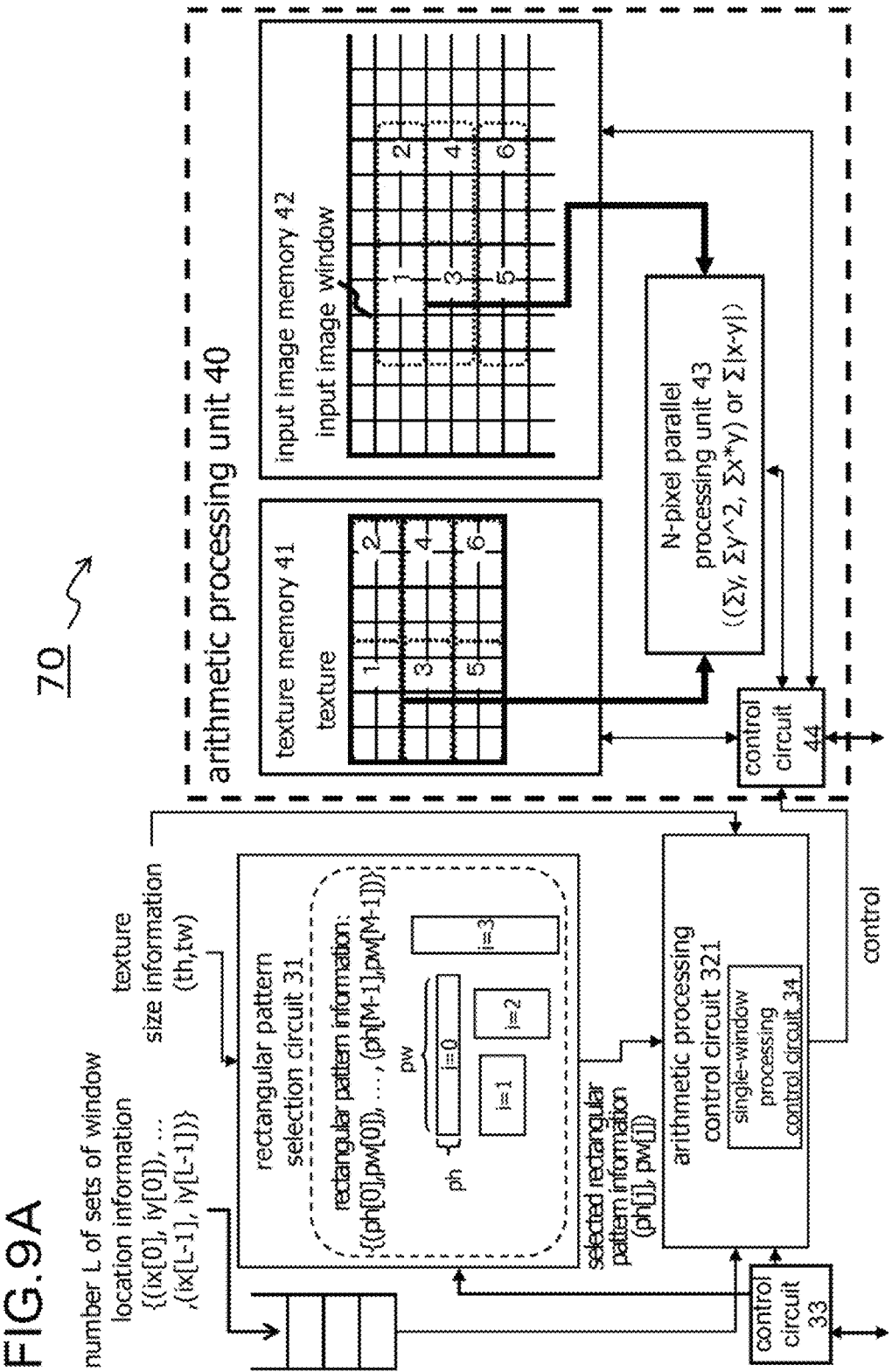
FIG. 9A illustrates a normalized correlation value processing apparatus 70 according to a fourth embodiment.
Figure 9C:
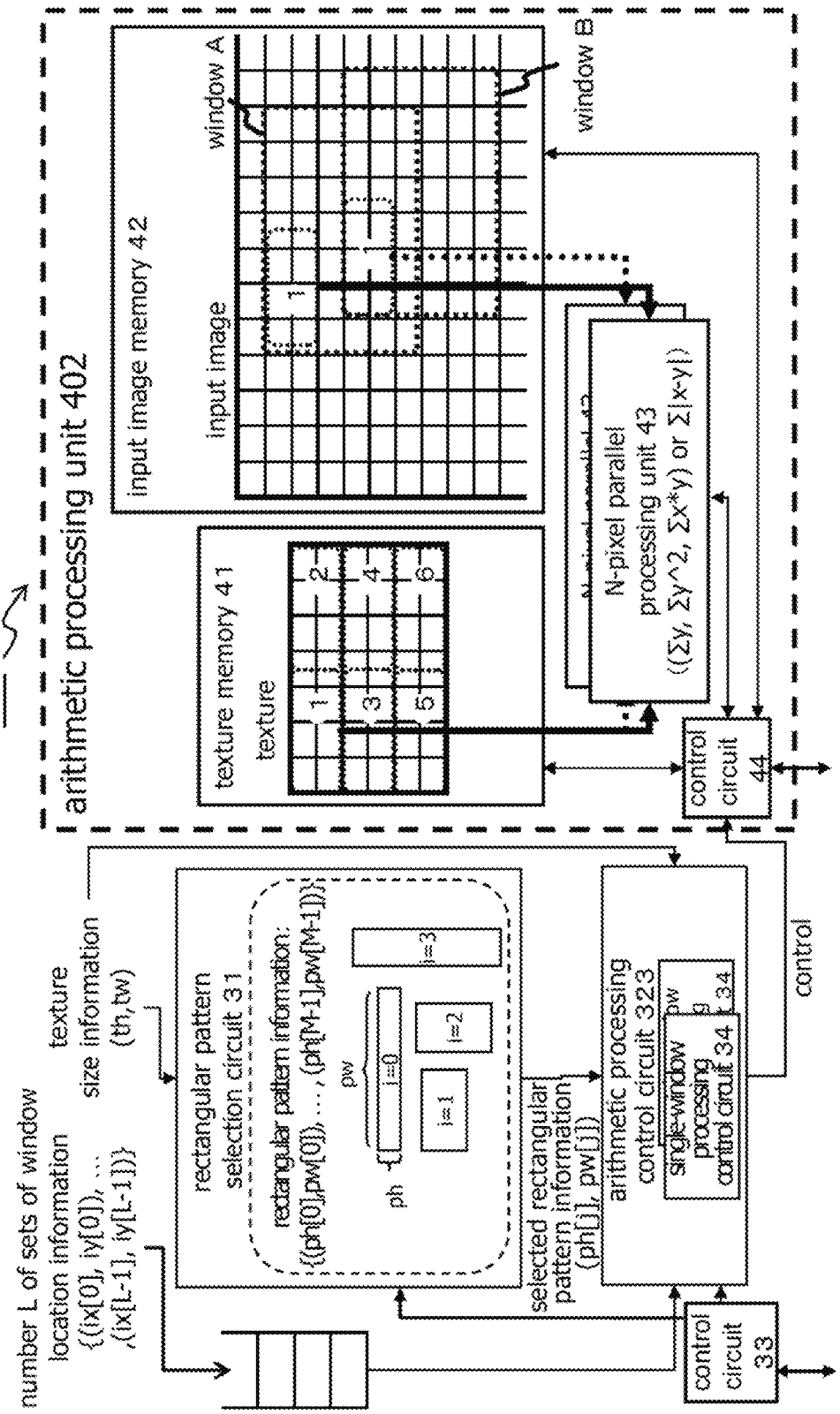
FIG. 9C illustrates yet another normalized correlation value processing apparatus 72 according to the fourth embodiment.

FIGS. 9A, 9B and 9C illustrate normalized correlation value processing apparatuses 70, 71, and 72 according to the fourth embodiment. Each of the normalized correlation value processing apparatus 70, 71, and 72 of the fourth embodiment receives a plurality of (L) sets of window location information at a time from a CPU 50 for use in operation.

FIG. 9A depicts the normalized correlation value processing apparatus 70, a rectangular pattern selection circuit 31, an arithmetic processing control circuit 321, a control circuit 33, and an arithmetic processing unit 40. The rectangular pattern selection circuit 31, the control circuit 33, and the arithmetic processing unit 40 are the same as the rectangular pattern selection circuit 31, the control circuit 33, and the arithmetic processing unit 40 described with respect to the first embodiment and therefore the description of these circuits will be omitted.

The arithmetic processing control circuit 321 receives rectangular pattern information from the rectangular pattern selection circuit 31 and receives L sets of window location information {(ix[0], iy[0]), . . . , (ix[L−1], iy[L−1])} from the CPU 50. A single-window processing control circuit 34 receives one of the L sets of window location information. The other sets of window information that are not used at the moment are stored in the arithmetic processing control circuit 321 and are used by the single-window processing control circuit 34 in sequence as needed. The single-window processing control circuit 34 is the same as the single-window processing control circuit 34 described with respect to the first embodiment.

In summary, a normalized correlation value processing apparatus 70 according to the fourth embodiment that obtains a correlation value between a texture (image to be found) and a window (rectangular subimage) in an input image (image being searched) includes:

parallel arithmetic processing units each including N arithmetic circuits (multipliers 431 to 439, where N is a positive integer) each performing an arithmetic operation on a texture image pixel value of an image pixel of the texture and a window image pixel value of an image pixel of the window;

a rectangular pattern selection circuit (rectangular pattern selection circuit 31) selecting a rectangular pattern that includes Q=ph×pw elements arranged in a matrix of ph rows and pw columns (where Q is a positive integer smaller than N and ph and pw are positive integers) and by which the texture is divided into the smallest number of divisions among a plurality of rectangular patterns;

a control circuit (arithmetic processing control circuit 321) receiving a plurality of sets of window location information, activating Q arithmetic circuits among the N arithmetic circuits in accordance with each of the sets of window location information, controlling the Q arithmetic circuits to read texture image pixel values of pixels in a rectangular pattern in location 1 in the texture from a texture memory 41 as values A1 to A8 to be input and controlling the Q arithmetic circuits to read window image pixel values of pixels in the rectangular pattern in location 1 in the window from an input image memory 42 as values B1 to B8 to be input; and an accumulator (an adder 440 and a register 441) accumulating the results of the arithmetic operations performed by the Q arithmetic circuits in each of the parallel arithmetic processing units.

Therefore, the normalized correlation value processing apparatus 70 according to the fourth embodiment is capable of parallel processing by receiving a plurality of sets of window location information in addition to parallel processing of elements of a rectangular pattern described with respect to the first to third embodiments.

FIG. 9B illustrates another normalized correlation value processing apparatus 71 according to the fourth embodiment. Depiction in FIG. 9B are the normalized correlation values processing apparatus 71, a rectangular pattern selection circuit 31, an arithmetic processing control circuit 322, a control circuit 33 and an arithmetic processing unit 401. The rectangular pattern selection circuit 31 and the control circuit 33 are the same as the rectangular pattern selection circuit 31 and the control circuit 33 described with respect to the first embodiment and therefore the description of these circuits will be omitted.

The arithmetic processing control circuit 322 is similar to the arithmetic processing control circuit 32 of the first embodiment but includes a plurality of single-window processing control circuits 34. The arithmetic processing control circuit 322 in the fourth embodiment includes two single-window processing control circuits 34. The single-window processing control circuits 34 are the same as that of the first embodiment and therefore description thereof will be omitted. The arithmetic processing control circuit 322 receives rectangular pattern information from the rectangular pattern selection circuit 31 and receives L sets of window location information {(ix[0], iy[0]), . . . , (ix[L−1], iy [L−1])} from the CPU 50. Each of the two single-window processing control circuits 34 receives the same set of window location information among the L sets of window location information in sequence. That is, the two single-window processing control circuits 34 process different regions of the same window.

The arithmetic processing unit 401 is similar to the arithmetic processing unit 40 of the first embodiment but includes a plurality of (two in the example) N-pixel parallel processing units 43. The two N-pixel parallel processing units 43 are associated with the two single-window processing control circuits 34 respectively and operate in parallel.

The arithmetic processing unit 40 in the first embodiment first reads texture image pixel values and window image pixels values from the texture memory 41 and the input image memory 42 in sequence starting in region 1 and moving toward region 6 in a texture and a window in accordance with a rectangular pattern. In contrast, the arithmetic processing unit 401 of the fourth embodiment reads texture image pixel values A1 to A8 and A11 to A18 and window image pixel values B1 to B8 and B11 to B18 in regions 1 and 2 in a texture and a window in parallel, then regions 3 and 4 in parallel, and then regions 5 and 6 in parallel.

In summary, a normalized correlation value processing apparatus 71 according to the fourth embodiment that obtains a correlation value between a texture (image to be found) and a window (rectangular subimage) in an input image (image being searched) includes:

a plurality of parallel arithmetic processing units, each including N arithmetic circuits (multipliers 431 to 439, where N is a positive integer) each performing an arithmetic operation on a texture image pixel value of an image pixel of the texture and a window image pixel value of an image pixel of the window;

a rectangular pattern selection circuit (rectangular pattern selection circuit 31) selecting a rectangular pattern that includes Q=ph×pw elements arranged in a matrix of ph rows and pw columns (where Q is a positive integer smaller than N and ph and pw are positive integers) and by which the texture is divided into the smallest number of divisions among a plurality of rectangular patterns;

a control circuit (arithmetic processing control circuit 321) receiving a plurality of sets of window location information, activating Q arithmetic circuits among the N arithmetic circuits in each of the parallel arithmetic processing units in accordance with each of the sets of window location information, controlling the Q arithmetic circuits to read texture image pixel values of pixels in a rectangular pattern in location 1 in the texture from a texture memory 41 as values A1 to A8 and A11 to A18 to be input, and controlling the Q arithmetic circuits to read window image pixel values of pixels in the rectangular pattern in location 1 in the window from an input image memory 42 as values B1 to B8 and B11 and B18 to be input; and an accumulator (an adder 440 and a register 441) accumulating the results of the arithmetic operations performed by the Q arithmetic circuits in each of the parallel arithmetic processing units.

Therefore, the normalized correlation value processing apparatus according to the fourth embodiment is capable of receiving a plurality of sets of window location information and parallel processing of a plurality of rectangular patterns in addition to the parallel processing of elements of a rectangular pattern described with respect to the first to third embodiments.

FIG. 9C illustrates another normalized correlation value processing apparatus 72 according to the fourth embodiment. Depiction in FIG. 9C are the normalized correlation values processing apparatus 72, a rectangular pattern selection circuit 31, an arithmetic processing control circuit 323, a control circuit 33, and an arithmetic processing unit 402. The rectangular pattern selection circuit 31 and the control circuit 33 are the same as the rectangular pattern selection circuit 31 and the control circuit 33 described with respect to the first embodiment and therefore description of these circuits will be omitted.

The arithmetic processing control circuit 323 is similar to the arithmetic processing control circuit 32 of the first embodiment but includes a plurality of single-window processing control circuits 34. The arithmetic processing control circuit 323 in the fourth embodiment includes two single-window processing control circuits 34. The single-window processing control circuits 34 are the same as that in the first embodiment and therefore description of these circuits will be omitted. The arithmetic processing control circuit 323 receives rectangular pattern information from the rectangular pattern selection circuit 31 and receives L sets of window location information {(ix[0], iy[0]), . . . , (ix[L−1], iy[L−1])} from the CPU 50. Each of the two single-window processing control circuit 34 receives one of two sets of window location information that is associated with the circuit 34. The number L of sets of window location information may be equal to or greater than the number of the single-window processing control circuits 34. The other sets of window location information that are not used at the moment are stored in the arithmetic processing control circuit 323 and used by the single-window processing control circuits 34 in sequence as needed. That is, the two single-window processing control circuits 34 operate on different windows. The single-window processing control circuits 34 operate on the same region of the windows.

The arithmetic processing unit 402 is similar to the arithmetic processing unit 40 of the first embodiment but includes a plurality of (two in this example) N-pixel parallel processing units 43. The two N-pixel parallel processing units 43 are associated with two single-window processing control circuits 34 respectively and operate in parallel.

The arithmetic processing unit 40 in the first embodiment first reads texture image pixel values and window image pixels values A1 to A8 from a texture memory 41 and an input image memory 42 in sequence starting in region 1 and moving toward region 6 in a texture and a window in accordance with a rectangular pattern. In contrast, the arithmetic processing unit 402 of the fourth embodiment reads texture image pixel values A1 to A8 and window image pixel values B1 to B8 and B11 to B18 in region 1 in the texture and windows A and B in parallel. Similarly, the arithmetic processing unit 402 reads texture image pixel values and window image pixel values of pixels in each of regions 2 to 6 in windows A and B in parallel.

In summary, a normalized correlation value processing apparatus 72 according to the fourth embodiment that obtains a correlation value between a texture (image to be found) and a window (rectangular subimage) in an input image (image being searched) includes:

a plurality of parallel arithmetic processing units, each including N arithmetic circuits (multipliers 431 to 439, where N is a positive integer) each performing an arithmetic operation on a texture image pixel value of an image pixel of the texture and a window image pixel value of an image pixel of the window;

a rectangular pattern selection circuit (rectangular pattern selection circuit 31) selecting a rectangular pattern that includes Q=ph×pw elements arranged in a matrix of ph rows and pw columns (where Q is a positive integer smaller than N and ph and pw are positive integers) and by which the texture is divided into the smallest number of divisions among a plurality of rectangular patterns;

a control circuit (arithmetic processing control circuit 321) receiving a plurality of sets of window location information, activating Q arithmetic circuits among the N arithmetic circuits in each of the parallel arithmetic processing units in accordance with each of the sets of window location information, controlling the Q arithmetic circuits to read texture image pixel values of pixels in a rectangular pattern in location 1 in the texture from a texture memory 41 as values A1 to A8 to be input, controlling the Q arithmetic circuits to read window image pixel values of pixels in the rectangular pattern in location 1 in window A from an input image memory 42 as values B1 to B8 to be input, and controlling the Q arithmetic circuits to read window image pixel values of pixels in a rectangular pattern in location 1 in window B from the input image memory 42 as values B11 to B18 to be input; and an accumulator (an adder 440 and a register 441) accumulating the results of the arithmetic operations performed by the Q arithmetic circuits in each of the parallel arithmetic processing units.

Therefore, the normalized correlation value processing apparatus according to the fourth embodiment is capable of receiving a plurality of sets of window location information and parallel processing of a plurality of rectangular patterns in addition to the parallel processing of elements of a rectangular pattern described with respect to the first to third embodiments.

Therefore, like the normalized correlation value processing apparatus according to the first embodiment, the normalized correlation value processing apparatus according to the fourth embodiment has a configuration capable of efficient parallel processing for calculating correlation between a texture and a window in applications requiring flexibility of setting of texture size and window location.

Because the normalized correlation value processing apparatus of the fourth embodiment receives a plurality of sets of window location and performs parallel processing, the normalized correlation value processing apparatus of the fourth embodiment is capable of parallel processing more efficiently than that of the first embodiment.

In the normalized correlation value processing apparatuses in the first to fourth embodiments, the rectangular pattern selection circuit selects a rectangular pattern and outputs rectangular pattern information to the arithmetic processing control circuit. However, rectangular pattern information may be provided directly from a CPU 50 or other source to the arithmetic processing control circuit without using the rectangular pattern selection circuit. An example will be described as a fifth embodiment.

[Fifth Embodiment]

A normalized correlation value processing apparatus 80 according to the fifth embodiment is similar to the normalized correlation value processing apparatus of the first embodiment with the difference being that a selection mode switching circuit is added.

Figure 10:
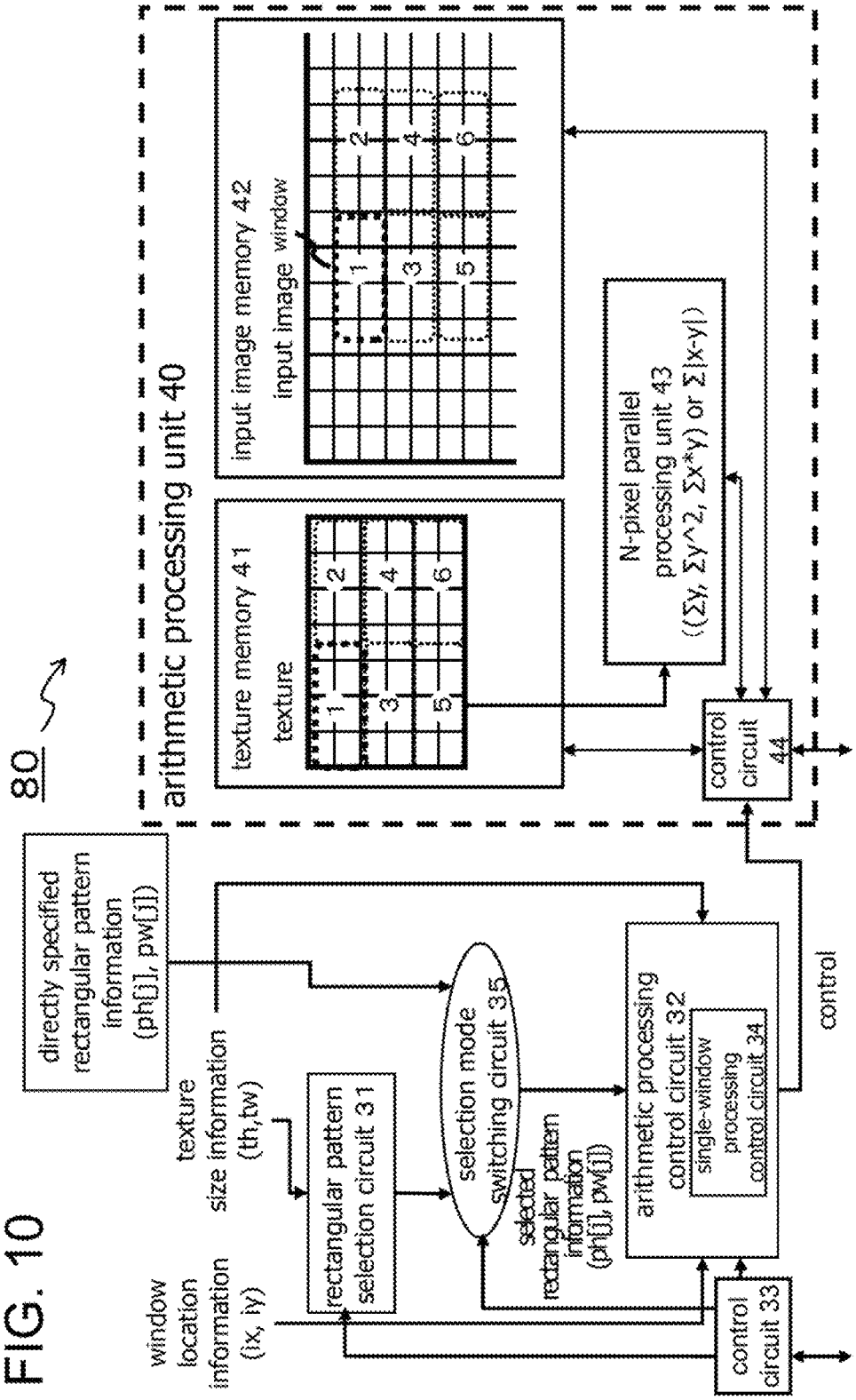
FIG. 10 illustrates a normalized correlation value processing apparatus 80 according to a fifth embodiment.

FIG. 10 illustrates a normalized correlation value processing apparatus 80 according to the fifth embodiment. Depiction in FIG. 10 are the normalized correlation values processing apparatus 80, a normalization pattern selection circuit 31, an arithmetic processing control circuit 32, a control circuit 33, a selection mode switching circuit 35, and an arithmetic processing unit 40. The rectangular pattern selection circuit 31, the arithmetic processing control circuit 32, the control circuit 33, and the arithmetic processing unit 40 are the same as the rectangular pattern selection circuit 31, the arithmetic processing control circuit 32, the control circuit 33, and the arithmetic processing unit 40 described with respect to the first embodiment and therefore description of these circuits will be omitted.

In accordance with a signal from the control circuit 33, the selection mode switching circuit 35 selects either rectangular pattern information from the rectangular pattern selection circuit 31 or directly specified rectangular pattern information and outputs the selected rectangular pattern information to the arithmetic processing control circuit 32.

The directly specified rectangular pattern information is rectangular pattern information provided from a CPU 50 or a source external to the normalized correlation value processing apparatus 80.

The control circuit 33 provides the signal to the selection mode switching circuit 35 under the control of the CPU 50.

In summary, the normalized correlation value processing apparatus 80 according to the fifth embodiment that obtains a correlation value between a texture (image to be found) and a window (rectangular subimage) in an input image (image being searched) includes:

- N arithmetic circuits (multipliers 431 to 439, where N is a positive integer) each performing an arithmetic operation on a texture image pixel value of an image pixel of the texture and a window image pixel value of an image pixel of the window;
- a rectangular pattern selection circuit (rectangular pattern selection circuit 31) selecting a first rectangular pattern that includes Q=ph×pw elements arranged in a matrix of ph rows and pw columns (where Q is a positive integer smaller than N and ph and pw are positive integers) and by which the texture is divided into the smallest number of divisions among a plurality of rectangular patterns, and outputting information concerning the selected first rectangular pattern;
- a selection mode switching circuit receiving information concerning a second rectangular pattern including T elements (where T is a positive integer smaller than N) and the information concerning the first rectangular pattern and outputting one of the information concerning the first rectangular pattern and the information concerning the second rectangular pattern;
- a control circuit (arithmetic processing control circuit 32) activating Q or T arithmetic circuits among the N arithmetic circuits on the basis of one of the information concerning the first rectangular pattern or the information concerning the second rectangular pattern from the selection mode switching circuit, controlling the Q or T activated arithmetic circuits to read texture image pixel values of pixels in a rectangular pattern in location 1 in the texture from a texture memory 41 as values A1 to A8 to be input, and controlling the Q or T activated arithmetic circuits to read window image pixel values of pixels in the rectangular pattern in location 1 in a window from an input image memory 42 as values B1 to B8 to be input; and
- an accumulator (an adder 440 and a register 441) accumulating the results of the arithmetic operations performed by the Q or T arithmetic circuits.

Therefore, like the normalized correlation value processing apparatus according to the first embodiment, the normalized correlation value processing apparatus according to the fifth embodiment has a configuration capable of efficient parallel processing for calculating correlation between a texture and a window in applications requiring flexibility of setting of texture size and window location.

The normalized correlation value processing apparatus according to the fifth embodiment is also capable of parallel processing on rectangular patterns provided from an external source.

In the normalized correlation value processing apparatus according to the first embodiment, dedicated circuits such as the setting registers 20, the control unit 30, and arithmetic processing unit 40 are provided separately from the CPU 50. However, means having functions equivalent to the setting registers 20, the control unit 30, and the arithmetic processing unit 40 may be provided in a CPU by loading a program into the CPU. An example will be described as a sixth embodiment.

[Sixth Embodiment]

Figure 11:
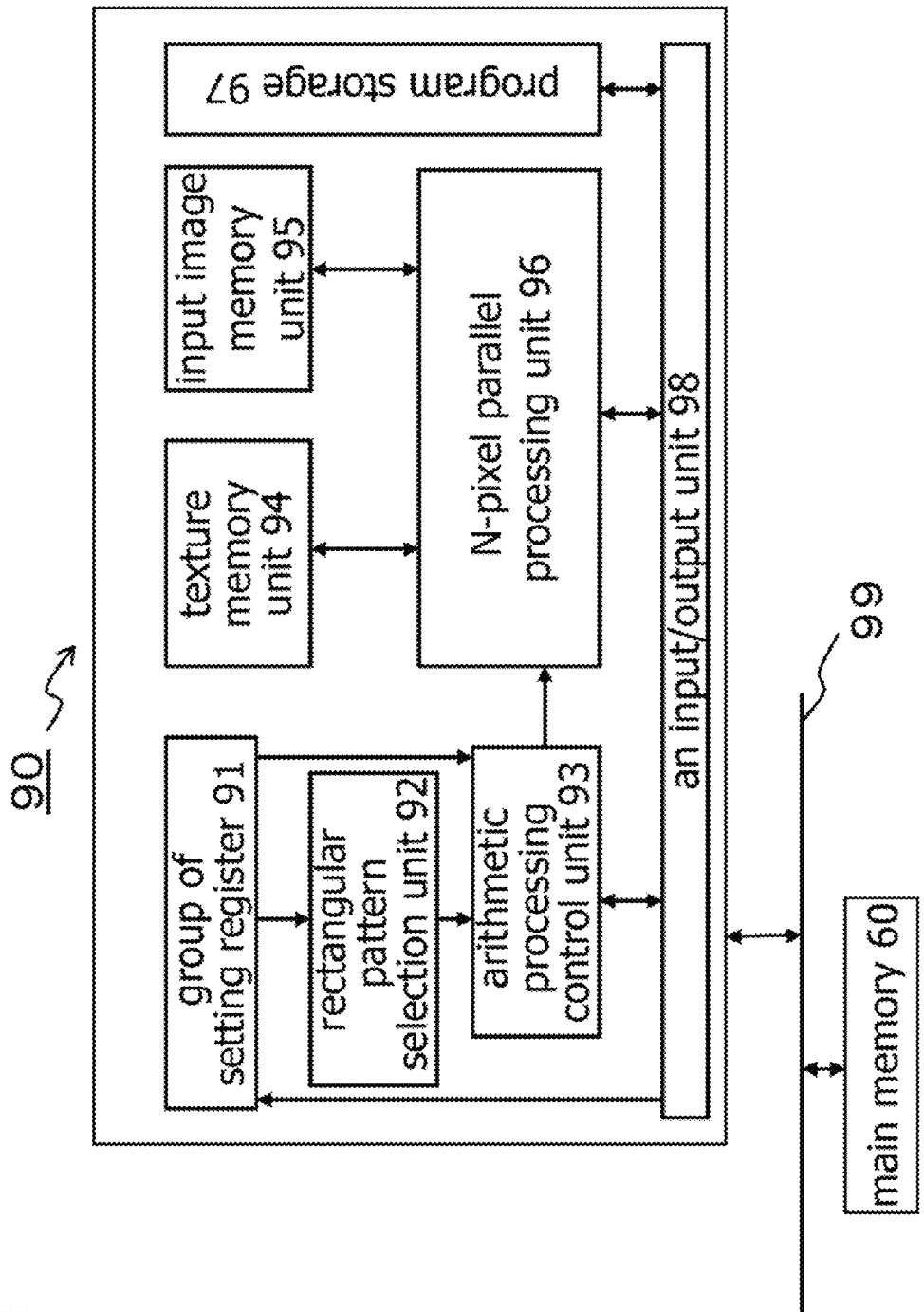
FIG. 11 is a diagram illustrating a normalized correlation value processing apparatus 90 according to a sixth embodiment.

FIG. 11 illustrates a normalized correlation value processing apparatus 90 according to the sixth embodiment. Depiction in FIG. 11 are a main memory 60 and a bus 99 as well as the normalized correlation value processing apparatus 90.

The normalized correlation value processing apparatus 90 includes a group of setting registers 91, a rectangular pattern selection unit 92, an arithmetic processing control unit 93, a texture memory unit 94, an input image memory unit 95, an N-pixel parallel processing unit 96, a program storage 97, and an input/output unit 98, which are implemented by a program loaded into a CPU.

The CPU typically includes an input/output circuit, an arithmetic processing circuit, a memory circuit, a logic processing circuit, and a clock generation circuit. The CPU reads a sequence of instructions according to the program loaded into the memory and executes logic processing to implement the functional units that achieve the purposes of the program, and transfer and process data. The functional units that perform calculations relating to correlation processing in the normalized correlation value processing apparatus 90 are the implemented setting registers 91, the rectangular pattern selection unit 92, the arithmetic processing control unit 93, the texture memory unit 94, the input image memory unit 95 and the N-pixel parallel processing unit 96.

The setting registers 91 have the same function as the setting registers 20 of the first embodiment. The rectangular pattern selection unit 92 has the same function as the rectangular pattern selection circuit 31 of the first embodiment. The arithmetic processing control unit 93 has the same function as the arithmetic processing control circuit 32 of the first embodiment. The texture memory unit 94 has the same function as the texture memory 41 of the first embodiment. The input image memory unit 95 has the function as the input image memory 42 of the first embodiment. The N-pixel parallel processing unit 96 has the same function as the N-pixel parallel processing unit 43 of the first embodiment. The main memory 60 is similar to the main memory 60 of the first embodiment 1.

The program storage 97 is a storage area storing the program that controls the normalized correlation value processing apparatus 90 to calculate a correlation value between an input image and a texture.

The input/output unit 98 is a unit through which data is input and output between the normalized correlation value processing apparatus 90 and the bus 99.

The bus 99 is a set of transmission lines transmitting data signals and instruction signal between the main memory 60 and the normalized correlation value processing apparatus 90.

In summary, the program loaded into the program storage 97 includes instruction codes causing a normalized correlation value processing apparatus 90 to calculate a correlation value between a texture (image to be found) and a window (rectangular subimage) in an input image (image being searched), the instruction code including:

- an instruction code causing N arithmetic circuits (multipliers in the N-pixel parallel processing unit 96, where N is a positive integer) to perform an arithmetic operation on texture image pixel values of the image pixels of the texture and window image pixel values of the image pixels of the window;
- an instruction code causing a rectangular pattern selection circuit (the rectangular pattern selection unit 92) to select a rectangular pattern that includes Q=ph×pw elements arranged in a matrix of ph rows and pw columns (where Q is a positive integer smaller than N and ph and pw are positive integers) and by which the texture is divided into the smallest number of divisions among a plurality of rectangular patterns;

an instruction code causing a control circuit (the arithmetic processing control unit 93) to activate Q arithmetic circuits among the N arithmetic circuits, control the Q arithmetic circuits to read texture image pixel values of pixels in a rectangular pattern in location 1 in the texture from a texture memory 41 as values A1 to A8 to be input, and control the Q arithmetic circuits to read window image pixel values of pixels in the rectangular pattern in location 1 in the window from an input image memory 42 as values B1 to B8 to be input; and an instruction code causing an accumulator (an adder and a register in the N-pixel parallel processing unit) to accumulate the results of the arithmetic operations performed by the Q arithmetic circuits.

Therefore, the control of the normalized correlation value processing apparatus 90 by the program may cause the normalized correlation value processing apparatus 90 to efficiently calculate correlation between a texture and a window in applications requiring flexibility of setting of texture size and window location.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A correlation processing apparatus that obtains a correlation value between an image to be found and a subimage in an image being searched, the apparatus comprising:

N arithmetic circuits (where N is a positive integer), each of the N arithmetic circuits performing an arithmetic operation on a first image pixel value of a first image pixel of the image to be found and a second image pixel value of a second image pixel of the subimage (where N is a positive integer);

a rectangular pattern selection circuit selecting a rectangular pattern among a plurality of predetermined rectangular patterns, the rectangular pattern including Q elements (where Q is a positive integer smaller than N), the smallest number of divisions is obtained if the image to be found is divided by the rectangular pattern;

a control circuit activating Q arithmetic circuits among the N arithmetic circuits and identifying Q first image pixel values and Q second image pixel values on which the arithmetic operations are performed by the Q arithmetic circuits;

an accumulator accumulating the results of the arithmetic operations performed by the Q arithmetic circuits;

a register holding location information of the subimage, wherein the control circuit identifies the Q second pixel values on the basis of the location information;

a first memory storing the first pixel values of pixels of the image to be found; and a second memory storing second image pixel values of pixels of the image being searched;

wherein the control circuit identifies the Q second pixel values from among the second image pixel values.

2. The correlation processing apparatus according to claim 1, further comprising:

a register holding size information of the image to be found, wherein the rectangular pattern selection circuit uses the size information to obtain the number of divisions into which the image to be found is divided by the rectangular pattern.

3. The correlation processing apparatus according to claim 1, wherein the arithmetic circuits are any of registers, multipliers, or subtracters.

4. A non-transitory medium that is readable by a correlation processing apparatus and stores a program for causing the correlation processing apparatus to obtain a correlation value between an image to be found and a subimage in an image being searched, the medium including:

an instruction code causing a rectangular pattern selection circuit of the correlation processing apparatus to select a rectangular pattern among a plurality of predetermined rectangular patterns, the rectangular pattern including Q elements, the smallest number of divisions is obtained if the image to be found is divided by the rectangular pattern;

an instruction code causing a control circuit of the correlation processing apparatus to activate Q arithmetic circuits among N arithmetic circuits (where N is a positive integer greater than Q) provided in the correlation processing apparatus in order to perform an arithmetic operation on a first image pixel value of a first image pixel of the image to be found and a second image pixel value of a second image pixel of the subimage;

an instruction code causing the Q arithmetic circuits of the correlation processing apparatus to perform the arithmetic operation;

an instruction code causing an accumulator of the correlation processing apparatus to accumulate results of arithmetic operations performed by the Q arithmetic circuits;

an instruction code causing a register of the correlation processing apparatus to hold location information of the subimage, wherein the control circuit identifies the Q second pixel values on the basis of the location information;

an instruction code causing a first memory of the correlation processing apparatus to store the first pixel values of pixels of the image to be found; and an instruction code causing a second memory of the correlation processing apparatus to store second image pixel values of pixels of the image being searched;

wherein the control circuit identifies the Q second pixel values from among the second image pixel values.

* * * * *